(12) United States Patent
Reuss

(10) Patent No.: US 11,297,026 B2
(45) Date of Patent: Apr. 5, 2022

(54) GENERATING AUTOMATED MESSAGES WITHIN MESSAGING THREADS THAT FACILITATE DIGITAL SIGNATURES BY VERIFIED USERS

(71) Applicant: Facebook, Inc., Menlo Park, CA (US)

(72) Inventor: Nathan L. Reuss, Half Moon Bay, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1286 days.

(21) Appl. No.: 15/662,152

(22) Filed: Jul. 27, 2017

(65) Prior Publication Data

US 2019/0036864 A1  Jan. 31, 2019

(51) Int. Cl.
*G06Q 50/00* (2012.01)
*H04L 51/52* (2022.01)
(Continued)

(52) U.S. Cl.
CPC ............ *H04L 51/32* (2013.01); *G06F 40/186* (2020.01); *G06Q 20/10* (2013.01); *G06Q 20/102* (2013.01);
(Continued)

(58) Field of Classification Search
CPC ........ G06Q 50/01; G06Q 20/08; G06Q 20/40; G06Q 20/401; G06Q 30/0279; G06Q 20/12; H04L 9/3247
See application file for complete search history.

(56) References Cited

U.S. PATENT DOCUMENTS

| 8,719,176 B1 * | 5/2014 | Harrison, Jr. ........ G06Q 10/103 |
| | | 705/319 |
| 10,067,148 B2 * | 9/2018 | Schreiter .................. C12N 9/12 |

(Continued)

FOREIGN PATENT DOCUMENTS

| WO | WO-2013120064 A1 * | 8/2013 | ............. G06Q 10/10 |
| WO | WO-2014012076 A1 * | 1/2014 | .......... G06Q 30/0273 |

OTHER PUBLICATIONS

Han, Hui and Trimi, Silvana;"Social Commerce Design: A Framework and Application", May 27, 2017, Journal of Theoretical and Applied Electronic Commerce Research, vol. 12, Issue 3; www.jtaer.com Year: 2017 (Year: 2017).*

(Continued)

*Primary Examiner* — Richard C Weisberger
(74) *Attorney, Agent, or Firm* — Keller Jolley Preece

(57) ABSTRACT

This disclosure covers systems and methods that verify a user's identity and generate automated messages within a messaging thread to prompt the user to digitally sign a digital document. Before generating such automated messages, the disclosed methods and systems optionally cause a client device to transition from presenting a newsfeed comprising a third party's digital content item to (alternatively or additionally) presenting a messaging thread. For instance, in some embodiments, the methods and systems provide a messaging thread for a user and the third party upon receiving a selection by the user of an option within the newsfeed associated with the digital content item. Within the messaging thread, the methods and systems then generate automated messages that prompt the user to digitally sign the digital document, such as a digital petition or contract.

14 Claims, 16 Drawing Sheets

(51) Int. Cl.
    *H04L 67/02* (2022.01)
    *H04L 9/32* (2006.01)
    *H04L 29/06* (2006.01)
    *G06Q 20/10* (2012.01)
    *G06Q 30/02* (2012.01)
    *G06Q 20/32* (2012.01)
    *H04W 4/021* (2018.01)
    *G06F 40/186* (2020.01)
    *H04W 12/108* (2021.01)
    *G06F 3/0482* (2013.01)
    *G06F 3/04883* (2022.01)
    *G06F 40/166* (2020.01)

(52) U.S. Cl.
    CPC ..... *G06Q 20/3223* (2013.01); *G06Q 30/0279* (2013.01); *H04L 9/3247* (2013.01); *H04L 63/0853* (2013.01); *H04L 63/102* (2013.01); *H04L 63/123* (2013.01); *H04L 67/02* (2013.01); *H04W 4/021* (2013.01); *H04W 12/108* (2021.01); *G06F 3/0482* (2013.01); *G06F 3/04883* (2013.01); *G06F 40/166* (2020.01); *G06Q 50/01* (2013.01); *H04L 2209/56* (2013.01)

(56) References Cited

U.S. PATENT DOCUMENTS

| | | | |
|---|---|---|---|
| 11,055,479 B2* | 7/2021 | Gazit | G06F 9/44526 |
| 2013/0232030 A1* | 9/2013 | Gockeler | G06Q 50/01 |
| | | | 705/26.8 |
| 2016/0104133 A1* | 4/2016 | Davis | G06Q 50/01 |
| | | | 705/39 |
| 2017/0134516 A1* | 5/2017 | Gutman | H04W 4/21 |
| 2018/0158114 A1* | 6/2018 | Twist | G06Q 30/0279 |

OTHER PUBLICATIONS

Giving to Be Seen: the Influence of Facebook Charitable Advertisements on Conspicuous Donation Behavior Lei Jia (Year: 2013).*

* cited by examiner

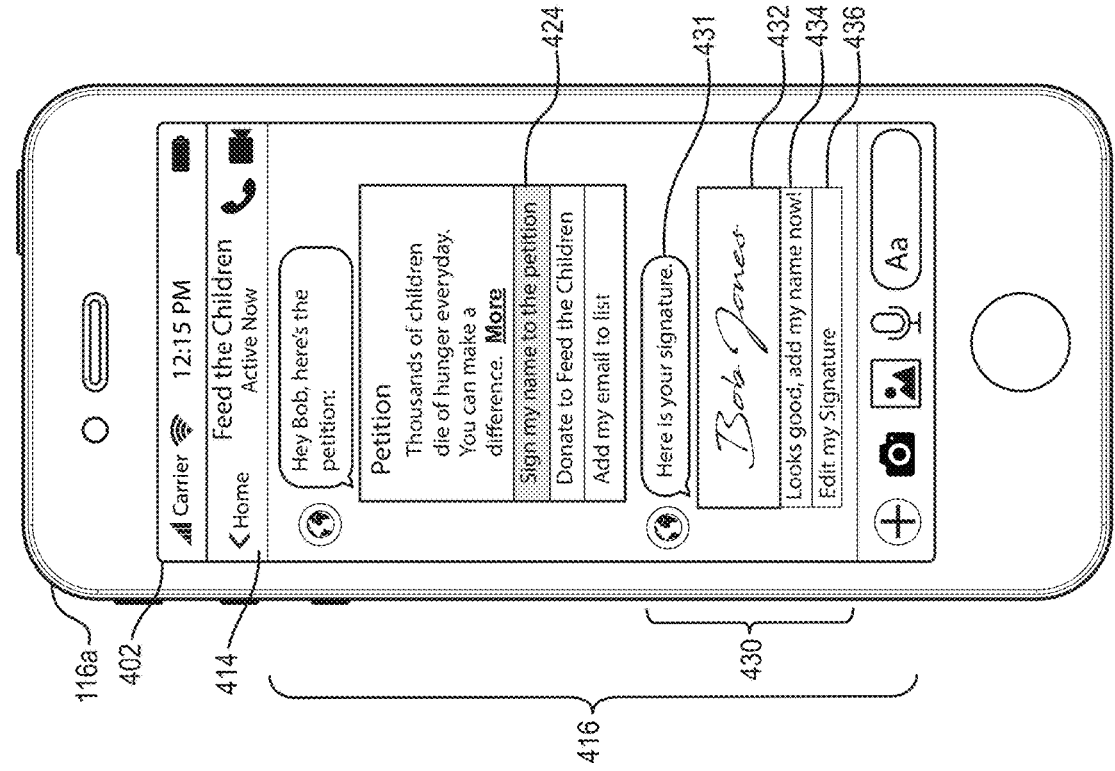
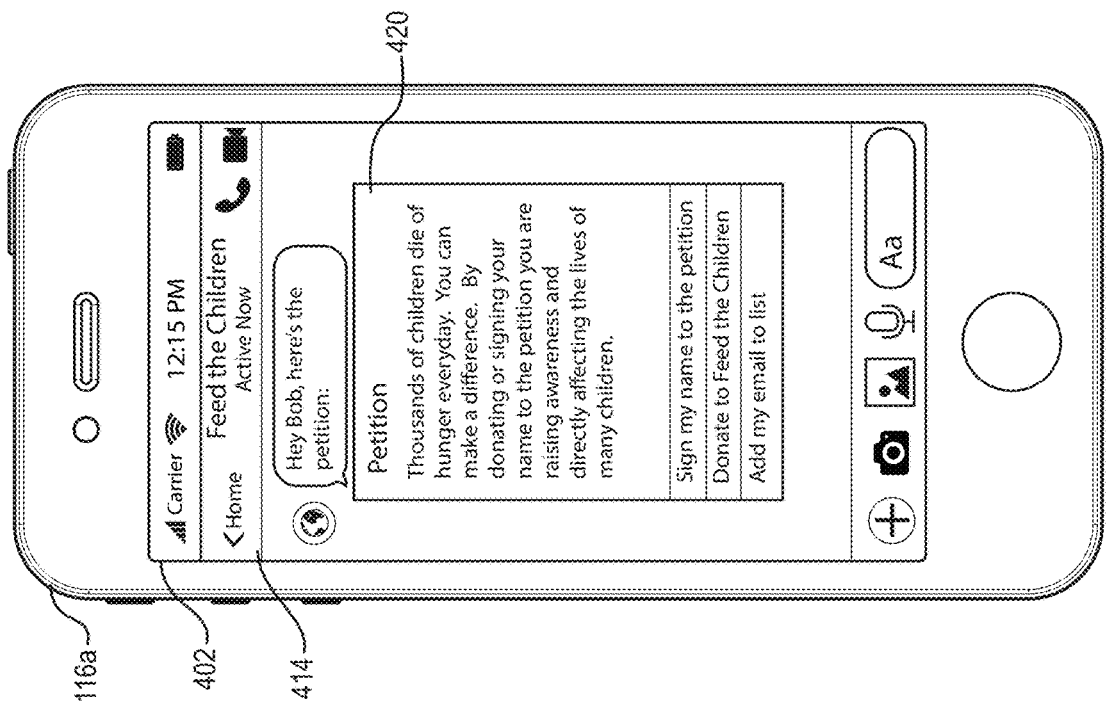
Fig. 4D
Fig. 4C

GENERATING AUTOMATED MESSAGES WITHIN MESSAGING THREADS THAT FACILITATE DIGITAL SIGNATURES BY VERIFIED USERS

BACKGROUND

Network users increasingly share and promote different types of digital content using social networking systems. For example, corporations, educational institutions, firms, and other organizations promote commercial products, data services, social causes, and other products and services using posts or in-application messages within a social networking system. Individual users likewise promote such causes, products, or services using private accounts of a social networking system.

But as some organizations and individuals proliferate digital content on social networking systems, other users perpetrate cyber fraud using certain existing social networking systems. Some existing social networking systems, for example, allow network users to create accounts using a pseudonym or alternative moniker. Regardless of the type of user account offered, some existing social networking systems also lack proper security checks for a user's identity and risk people or software bots creating accounts using fictitious or stolen identities. Given these security vulnerabilities, organizations and individuals may inadvertently promote causes or transact electronic commerce with fictitious users or false accounts using a social networking system. This increased cyber fraud impedes organizations and individuals from promoting causes or conducting electronic commerce with real users using social networking systems.

In addition to cyber-security concerns, the proliferation of digital content on social networking systems has complicated the sharing of digital content in public, semi-public, and private communication forums. Some existing social networking systems, for example, provide digital forums for users to share digital content publicly or with a group of selected contacts, but lack corresponding digital forums for users to exchange information privately in a secure environment. For example, certain existing social networking systems provide a social feed or timeline in which users may post images or other digital content items, but lack a corresponding digital forum that enables users to privately exchange information about (or in connection with) such digital content items.

Accordingly, some existing social networking systems lack security mechanisms that ensure organizations and individuals promote causes, products, and services to real users and not to fictitious users or deceivers using stolen social-networking accounts. Additionally, some existing social networking systems lack transition mechanisms that enable users to move from a public or semi-public digital forum into a private forum with a third party to exchange information about (or in connection with) digital content.

SUMMARY

This disclosure describes one or more embodiments of methods and systems that solve the foregoing problems in addition to providing other benefits. To solve these and other problems, the disclosed methods and systems verify a user's identity and generate automated messages within a messaging thread to prompt the user to digitally sign a digital document. Before generating such automated messages, the disclosed methods and systems optionally cause a client device to transition from presenting a newsfeed comprising a third party's digital content item to (alternatively or additionally) presenting a messaging thread. For instance, in some embodiments, the methods and systems provide a messaging thread for a user and the third party upon receiving a selection by the user of an option within the newsfeed associated with the digital content item. Within the messaging thread, the methods and systems then generate automated messages that prompt the user to digitally sign the digital document, such as a digital petition or contract.

In some embodiments, for instance, the methods and systems provide a user of a social networking system a newsfeed comprising a digital content item for a third party. Upon receiving a selection by the user of a selectable option associated with the digital content item, the methods and systems provide a messaging thread between the user and the third party. Within this messaging thread, the methods and systems generate a first automated message that comprises a signature option to digitally sign a digital document. When the user selects the signature option, the methods and systems generate a second automated message comprising an image of a digital signature for the user to add to the digital document. The disclosed methods and systems also verify the user's identity. Based on the user's selection to add the digital signature and verification of the user's identity, the methods and systems add the digital signature to the digital document.

By transitioning from a newsfeed to a messaging thread that facilitates a digital signature, the disclosed methods and systems provide a digital forum (i.e., a newsfeed) that facilitates promoting causes, products, or services associated with digital documents and a one-on-one digital forum (i.e., a messaging thread) in which the digital document can be signed. This transition from a newsfeed to a messaging thread avoids the exchange of sensitive information on a timeline, comment section, newsfeed, or other, more visible space of a social networking system. The automated messages further facilitate organizations and individuals in promoting causes, products, and services on a social networking system that benefit from (or require) a digital signature from a verified user.

BRIEF DESCRIPTION OF THE DRAWINGS

The detailed description refers to the drawings briefly described below.

FIGS. 4A-4I illustrate user interfaces of a client device presenting automated messages within a messaging thread for a verified user of a social networking system to digitally sign a digital document, pay a third party, or join an email-distribution list in accordance with one or more embodiments.

DETAILED DESCRIPTION

Figure 1:
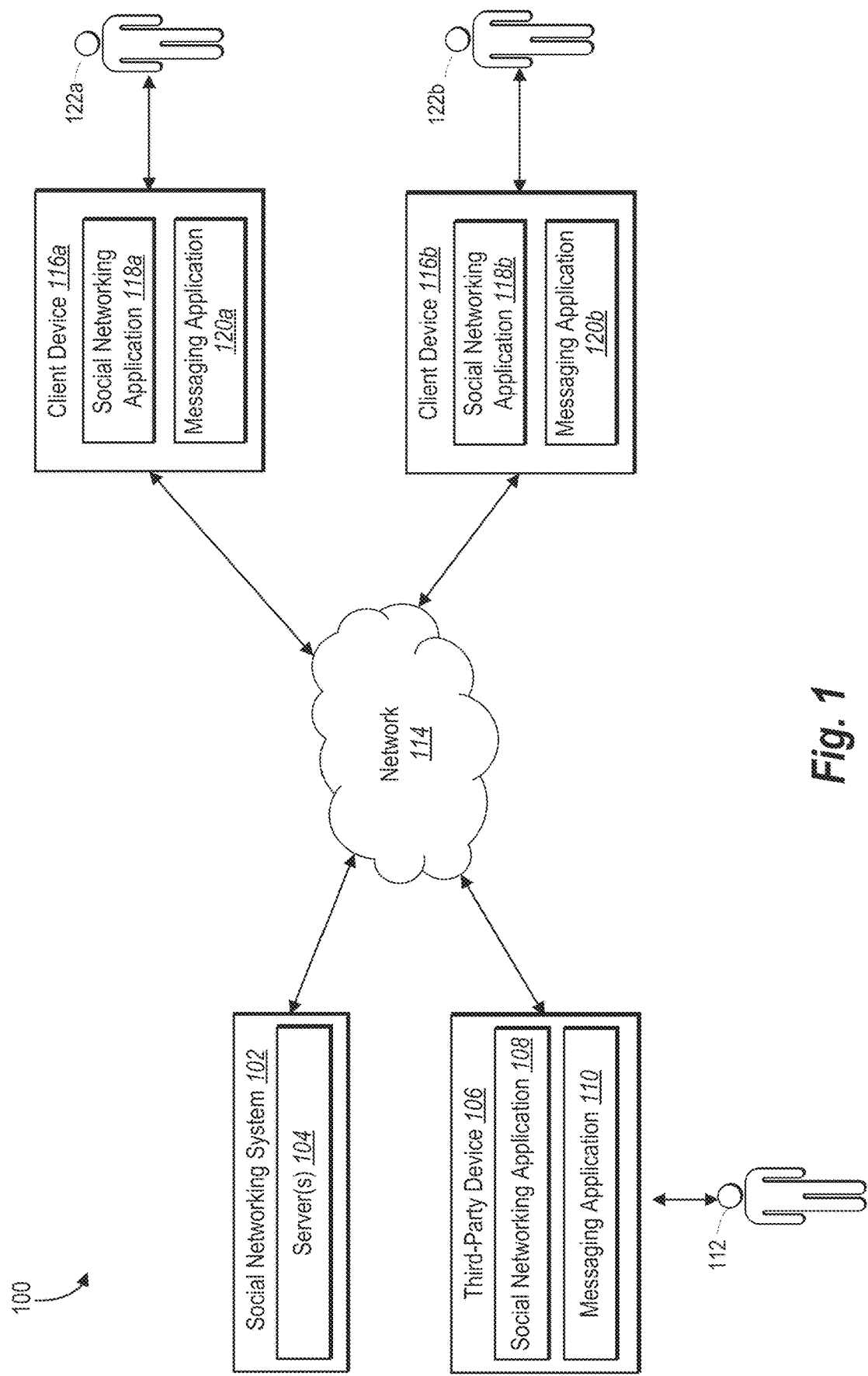
FIG. 1 illustrates a block diagram of an environment for implementing a social networking system in accordance with one or more embodiments.

This disclosure describes one or more embodiments of a social networking system that verifies a user's identity and generates automated messages within a messaging thread to prompt the user to digitally sign a digital document. Before generating such automated messages, the social networking system optionally causes a client device to transition from presenting a newsfeed comprising a third party's digital content item to presenting a messaging thread. For instance, in some embodiments, the social networking system provides a messaging thread for a user and the third party upon receiving a selection by the user of an option within the newsfeed associated with the digital content item (e.g., a call-to-action button or link). Within the messaging thread, the social networking system generates automated messages that prompt the user to digitally sign the digital document, such as a digital petition or contract.

In some embodiments, for instance, the social networking system provides a user of a social networking system a newsfeed comprising a digital content item for a third party. Upon receiving a selection by the user of a selectable option associated with the digital content item, the social networking system provides (e.g., generates and/or opens) a messaging thread between the user and the third party. Within this messaging thread, the social networking system generates a first automated message that comprises a signature option to digitally sign a digital document. When the user selects the signature option, the social networking system generates a second automated message comprising an image of a digital signature for the user to add to the digital document. The social networking system further verifies the user's identity. Based on the user's selection to add the digital signature and verification of the user's identity, the social networking system adds the digital signature to the digital document.

The image of the digital signature may take several forms. For example, in some embodiments, the image of the digital signature comprises a preloaded image of a previous digital signature that a user can confirm represents her digital signature. Additionally, in some embodiments, the social networking system provides a digital signature field in which the user inputs a digital signature, such as by drawing a digital signature with touch gestures on a touch screen. In yet additional embodiments, the social networking system automatically generates an image of a digital signature based on a name designated for an account of the user for the social networking system.

In addition to adding a digital signature to a digital document, in certain embodiments, the social networking system provides selectable options within the messaging thread to share the user's support for the third party in one of the system's digital forums. For example, in some instances, the social networking system provides a post-sharing option within the messaging thread that (upon selection) triggers the social networking system to generate a suggested digital content item for the user to post to the user's timeline or otherwise share with other users of the social networking system. In some such instances, the suggested digital content item indicates the user's support for the third party, such as by indicating that the user digitally signed a digital document associated with the third party.

The suggested digital content item also optionally includes a selectable option (e.g., a call-to-action button or link) that triggers the social networking system to provide an additional messaging thread to another user to facilitate more digital signatures of the digital document. By suggesting that users post digital content with such selectable options, the social networking system can create a digital snowball effect. When users post the suggested digital content with options to support the third party, the social networking system encourages more users to support a cause, product, or service associated with the third party and a digital document (e.g., a petition for a social cause or contract for a product or service).

Similarly, in some embodiments, the social networking system provides a message-sharing option within the messaging thread that (upon selection) triggers the social networking system to provide a list of the user's contacts (e.g., friends or followers) and a suggested message for the user to send in a messaging thread to other users. Similar to the suggested digital content item, in some such instances, the suggested message indicates the user's support for the third party, such as by indicating that the user digitally signed a digital document associated with the third party. The suggested message also optionally includes a selectable option that triggers similar messaging threads to facilitate more digital signatures of the digital document by users to whom the suggested messages are sent.

In addition to selectable options that facilitate digital signatures, in certain embodiments, the disclosed social networking system also provides options within a messaging thread that facilitate paying a third party and/or adding a user's email address to an email-distribution list. In some such embodiments, the social networking system includes within an automated message a payment option that (upon selection) causes a client device to generate payment fields to facilitate a user's donation or payment to a third party. Additionally, or alternatively, the social networking system includes within an automated message an email-distribution option that (upon selection) causes the social networking system to automatically provide an email address associated with an account of the user for addition to the third party's email-distribution list.

As noted above, some existing social networking systems lack transition mechanisms that enable users to move from a public- or semi-public digital forum into a private digital forum with a third party to exchange information concerning digital content. For example, some existing social networking systems provide no mechanism for a user to privately send messages to another user or organization (with which the user is not connected) to process a digital signature, complete a financial transaction, or add an email to an email-distribution list. In the mobile device context, for example, some existing social networking systems cannot transition from a mobile-software application that facilitates the display of digital content to multiple users, on the one hand, to a mobile-software application that facilitates the exchange of information in a secure, one-on-one context.

The disclosed social networking system solves these problems by providing a selectable option and corresponding back-end systems that transition a client device from presenting a newsfeed to presenting a messaging thread with automated messages that prompt the user's digital signature. The disclosed social networking system thus provides a digital forum (i.e., a newsfeed) that facilitates promoting causes, products, or services associated with digital documents and a one-on-one digital forum (i.e., a messaging thread) in which the digital document can be signed, a payment made, or email address added to a list. In some embodiments, for instance, the selectable option triggers a client device to transition from a social networking application with a newsfeed to a messaging application with a messaging thread for the user and a third party to exchange sensitive information. Similarly, in some embodiments, the selectable option triggers a client device to transition from a web browser with a newsfeed to overlay a messaging thread for the user and a third party to exchange sensitive information.

As also noted above, some existing social networking systems lack security mechanisms that ensure organizations and individuals promote causes, products, and services to real users, instead of fictitious users or deceivers using stolen accounts. The disclosed social networking system solves this problem by using a chatbot that generates automated messages for gathering digital signatures, payments, and email addresses from verified users. After the social networking system verifies a user's identity, the social networking system uses a chatbot to represent the third party in a one-on-one messaging thread between the user and the chatbot. This private messaging thread allows users to securely exchange sensitive information away from the more visible digital forums of some social networking systems.

Turning now to the figures, FIG. 1 illustrates a block diagram of one embodiment of a system environment 100 in which a social networking system 102 operates. As illustrated in FIG. 1, the system environment 100 includes the social networking system 102, including server(s) 104. The system environment 100 further includes a third-party device 106 and client devices 116a and 116b. As depicted in FIG. 1, the third-party device 106 has an associated third party 112. Similarly, each of the client devices 116a and 116b have an associated user—with a user 122a associated with the client device 116a and a user 122b associated with the client device 116b.

Figure 4B:
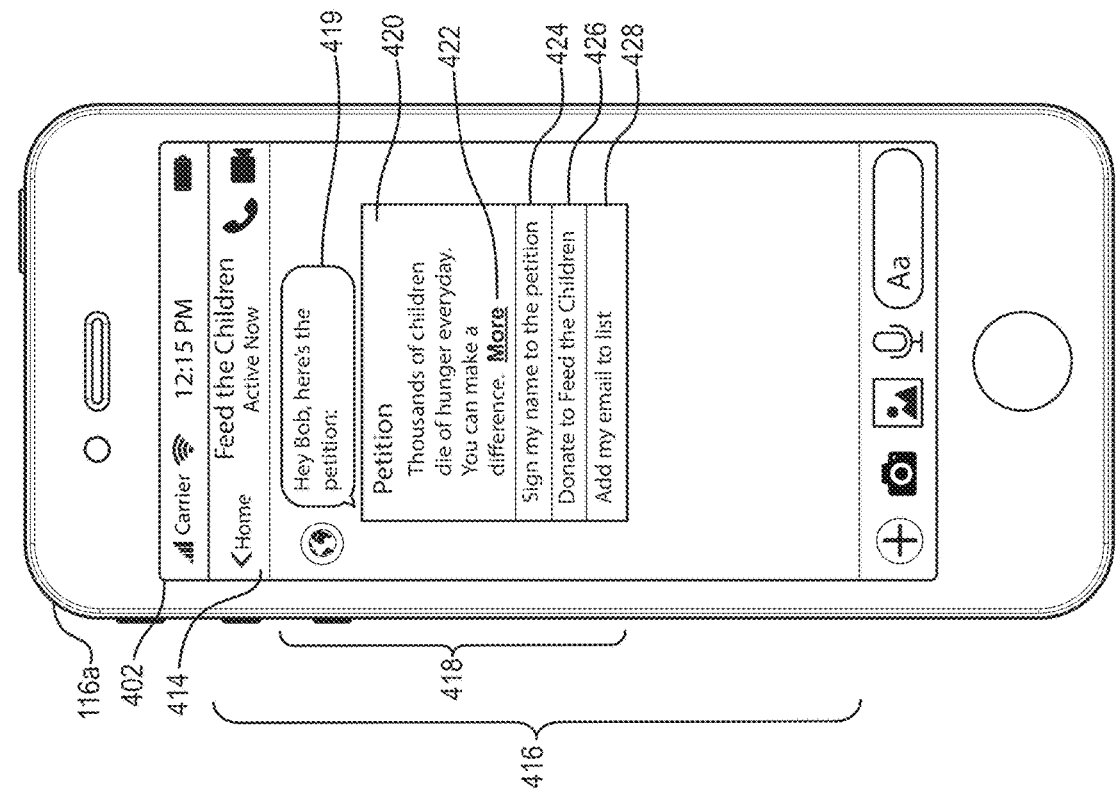
Figure 4A:
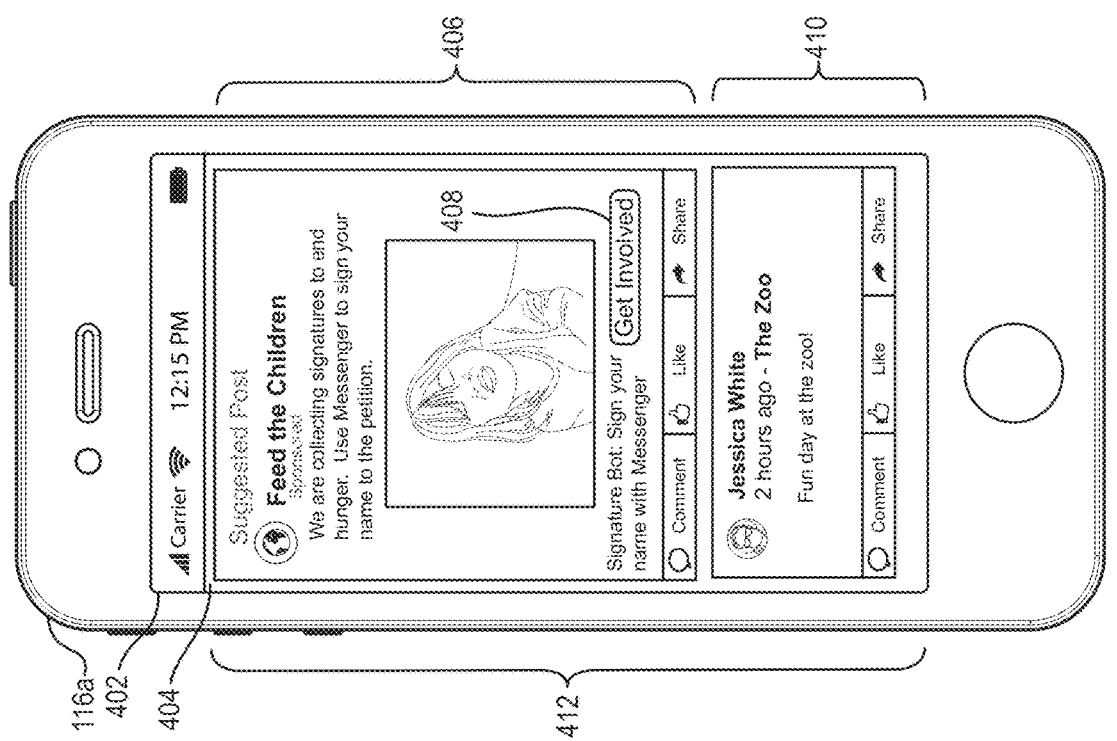

As suggested by FIG. 1, the third party 112 sends a digital content item from the third-party device 106 to the social networking system 102 to share with other users (e.g., users 122a and 122b). As used in this disclosure, the term "digital content item" refers to any digital image, photo, text, symbol, video, file, or any combination thereof capable of posting to or sharing through a social networking system. For example, a digital content item can include an image and accompanying text with a call-to-action button posted within a newsfeed for a user of the social networking system 102. As another example, a digital content item can include a video with an accompanying link posted within a newsfeed for a user of the social networking system 102. FIG. 4A below provides a further example of a digital content item.

The term "newsfeed" refers to a compilation of recent social networking activity on a social networking system relevant to a user. For example, a newsfeed includes recently posted digital content items from a user's friends, followees, or contacts on the social networking system 102. A newsfeed may also include digital content items distributed by third parties, such as sponsored digital content items that promote a cause, product, or service. In some embodiments, the client devices 116a and 116b present newsfeeds with digital content items within a graphical user interface. FIG. 4A below provides a further example of a newsfeed.

After the social networking system 102 adds a digital content item to newsfeeds for the user 122a and 122b, one or both of the users 122a and 122b view the digital content item on their respective client devices 116a and 116b. Although FIG. 1 illustrates a particular number of client devices 116a and 116b and a particular number of associated users 122a and 122b, the system environment 100 may include any number of client devices and any number of associated users. Any number of these users may view digital content items from third parties within the users' respective newsfeeds.

When the client device 116a presents the digital content item within a newsfeed for the user 122a, for example, the client device 116a receives an indication of a selection by the user 122a of a selectable option associated with the digital content item for the third party 112. In some embodiments, this selection triggers the social networking system 102 to provide a messaging thread to the client device 116a. The provided messaging thread is private and between the third party 112 and the user 122a. In some embodiments, the social networking system 102 digitally encrypts the messages sent and received over the network 114 as part of the messaging thread.

As used in this disclosure, the term "messaging thread" refers to a collection of one or more digital messages exchanged between users of a networking system. Accordingly, a messaging thread may include multiple digital messages sent and received exclusively by users of the social networking system 102. But a messaging thread may likewise include a single digital message sent exclusively from one user to another user of the social networking system 102. In some embodiments, both the third party 112 and a chatbot that represents the third party 112 have access to a messaging thread between the third party 112 and another user of the social networking system 102, such as the user 122a. As described below, in some embodiments, the third-party device 106 and the client devices 116a and 116b present graphical user interfaces that include messaging threads, such as the messaging threads shown in FIGS. 4B-4E and 4I described below.

In addition to being private, the provided messaging thread is shown to a verified user. The social networking system 102 verifies an identity of the user 122a sometime before providing the messaging thread. For example, in some embodiments, the social networking system 102 compares a username and password to a username and password associated with an account of the user 122a. Additionally, in certain embodiments, the social networking system 102 also compares a location of the client device 116a and a device identifier of the client device 116a to locations and device identifiers of one or more client devices tracked within a user history for the user 122a.

Continuing the example from above, after providing a messaging thread to the client device 116a, the social networking system 102 generates automated messages that prompt the user to perform certain tasks. Specifically, in some embodiments, the social networking system 102 uses a chatbot to generate such automated messages. For example, a chatbot may generate automated messages that prompt the user 122a to digitally sign a digital document, pay the third party 112, and/or add an email address to an email-distribution list.

As used in this disclosure, the term "automated message" refers to a digital message that a chatbot generates within a messaging thread. For example, an automated message may include text and selectable options that prompt a user to perform tasks. Moreover, an automated message may likewise include a digital document that the automated message prompts a user to sign and/or an image of a digital signature for a user to add to the digital document. FIGS. 4B-4E and 4I below provide examples of automated messages.

Relatedly, the term "digital document" refers to any document represented in a digital format. A digital document may include, but is not limited to, a digital agreement, contract, financial statement, indenture, license, memorandum, pledge, promissory note, petition, tax form, written statement, waiver, or image. In some embodiments, a digital document includes fields within which a digital signature may be added. The term "digital signature" refers to any signature generated or captured by a computing device (e.g., initials, a name, a code). A digital signature includes, but is not limited to, a signature drawn with a mouse, stylus, or touch gesture using a computer interface (e.g., a finger drawing a signature on a touch screen) or an automatically generated representation of a user's signature based on a name designated for an account of a user of the social networking system 102. FIGS. 4B and 4D described below provide examples of digital signatures. In some embodiments, the social networking system 102 provides a digital signature in the form of an image, such as a JPG file comprising a digital signature.

After the social networking system 102 has provided a messaging thread, it optionally generates an automated message within the messaging thread that prompts the user 122a to sign a digital document. In some such embodiments, the social networking system 102 provides an image of a digital signature for the user 122a to add to the digital document. After receiving a confirmation that the digital signature represents a signature of the user 122a or receiving a new digital signature from the user 122a, the social networking system 102 adds a digital signature for the user 122a to the digital document.

When sending and receiving digital content items, digital messages, or other content, the third-party device 106 and the client devices 116a and 116b communicate over a network 114 with the social networking system 102, including the server(s) 104. This disclosure describes additional details related to the social networking system 102 below with reference to FIGS. 7-8. Additionally, the network 114 may represent a network or a collection of networks, such as the Internet, a corporate intranet, a local area network ("LAN"), or a combination of two or more such networks. The network 114 may also be any suitable network over which the third-party device 106 and the client devices 116a and 116b (or other components) access the social networking system 102 (or vice versa).

As further shown in FIG. 1, the server(s) 104 can enable the various functions, features, processes, methods, and systems described in this disclosure using, for example, instructions within the social networking system 102. Additionally, or alternatively, the server(s) 104 coordinate with the third-party device 106 and/or the client devices 116a and 116b to perform or provide the various functions, features, processes, methods, and systems described in more detail below. Although FIG. 1 illustrates a particular arrangement of the social networking system 102, server(s) 104, third-party device 106, network 114, and client devices 116a and 116b, various additional arrangements are possible. For example, the social networking system 102 and the server(s) 104 may directly communicate with the third-party device 106 and/or the client devices 116a and 116b and thus bypass the network 114.

Generally, the third-party device 106 and client devices 116a and 116b can include any one of various types of client devices. For example, the third-party device 106 or client devices 116a and 116b can include a mobile device (e.g., a smart phone), tablet, laptop computer, desktop computer, television, or any other type of computing device as further explained below with reference to FIG. 6. Similarly, the server(s) 104 can include one or more computing devices, including those explained below with reference to FIG. 6. Moreover, the server(s) 104, social networking system 102, third-party device 106, network 114, and client devices 116a and 116b may communicate using any communication applications and technologies suitable for transporting data and/or communication signals, including any known communication technologies, devices, media, and protocols supportive of data communications, examples of which are described below with reference to FIG. 7.

As an overview of the system environment 100, the server(s) 104 provide the third-party device 106 and client devices 116a and 116b access to the social networking system 102 through the network 114. In one or more embodiments, when accessing the server(s) 104 of the social networking system 102, the third-party device 106 transmits digitally encoded data to the social networking system 102, such as digitally encoded data for a digital content item or digital message. For example, the social networking system 102 may provide a web site that enables the third party 112 to send digital content items for posting to a page/account for the third party and adding to the newsfeeds of users of the social networking system 102. By contrast, in one or more embodiments, when the client devices 116a and 116b access the server(s) 104 of the social networking system 102 (e.g., through a website), the client devices 116a and 116b receive a transmission of digitally encoded data from the social networking system 102, such as digitally encoded data for a digital content item or digital message.

Additionally, or alternatively, the third-party device 106 and the client devices 116a and 116b communicate with the server(s) 104 of the social networking system 102 via dedicated applications on the third-party device 106 and the client devices 116a and 116b. In particular, the third-party device 106 and the client devices 116a and 116b each have an associated social networking application and messaging application—with a social networking application 108 and a messaging application 110 associated with the third-party device 106, a social networking application 118a and a messaging application 120a associated with the client device 116a, and a social networking application 118b and a messaging application 120b associated with the client device 116b.

Among other things, the social networking applications 108, 118a, and 118b provide tools for the third party 112 and the users 122a and 122b to send digital content items to the social networking system 102 for posting on timelines or newsfeeds for users. By contrast, the messaging applications 110, 120a, and 120b facilitate direct messaging within a messaging thread between the third party 112 (or a chatbot for the third party 112) and another user of the social networking system 102. Although FIG. 1 depicts the social networking applications 108, 118a, and 118b, on the one hand, and the messaging applications 110, 120a, and 120b, on the other hand, as separate applications from each other, in an alternative embodiment, the messaging applications 110, 120a, and 120b are respectively part of the social networking applications 108, 118a, and 118b (or vice versa).

In some embodiments, the social networking applications 108, 118a, and 118b and the messaging applications 110, 120*a*, and 120*b* comprise web browsers, applets, or other software applications (e.g., native applications) available to the third-party device 106 and the client devices 116*a* and 116*b*. Additionally, in some instances, the social networking system 102 provides data packets including instructions that, when executed by the third-party device 106 or the client devices 116*a* and 116*b*, respectively create or otherwise integrate the social networking applications 108, 118*a*, and 118*b* within an application or webpage. Similarly, in some instances, the social networking system 102 provides data packets including instructions that, when executed by the third-party device 106 or the client devices 116*a* and 116*b*, respectively create or otherwise integrate messaging applications 110, 120*a*, and 120*b* within an application or webpage.

As suggested above, the third-party device 106 may share digital content items with the client device 116*a* and 116*b*. In some cases, the third-party device 106 launches the social networking application 108 to facilitate interacting with the social networking system 102. In some such embodiments, the social networking application 108 coordinates communications between the third-party device 106 and the server (s) 104 such that, for example, the third-party device 106 sends a digital content item to the social networking system 102 (and the social networking system 102 in turn sends the digital content item to the client devices 116*a* and 116*b*) to add to a newsfeed for a user.

To facilitate user interaction with the social networking system 102, the social networking application 108 and the messaging application 110 each optionally comprise one or more graphical user interfaces associated with the social networking system 102; receive indications of interactions of the third party 112 with the graphical user interfaces; and perform various requests, queries, or responses to other user input, such as displaying a digital content item in the social networking application 108 or displaying a messaging thread within the messaging application 110. Similarly, the social networking applications 118*a* and 118*b* and the messaging applications 120*a* and 120*b* each perform the same functions for the client devices 116*a* and 116*b* (and the users 122*a* and 122*b*) as the social networking application 108 and the messaging application 110 performs for the third-party device 106 (and the third party 112).

For example, the graphical user interfaces of the social networking application 108 and social networking applications 118*a*-118*b* facilitate the transmission of digital content items for display within a newsfeed or with other content. Based on detecting an interaction between the user 122*a* and a graphical user interface (provided by the client device 116*a*)—such as a selection of a selectable thumbnail for the social networking application 118*a*—the client device 116*a* verifies an identity of the user 122*a*. After verifying the identity of the user 122*a*, the client device 116*a* requests a newsfeed from the social networking system 102. Upon receiving the request, the social networking system 102 transmits a digital content item for the third party 112 with a newsfeed to the client device 116*a*.

The client device 116*a* then presents the digital content item within the newsfeed in a graphical user interface. Based on detecting an additional interaction between the user 122*a* and a graphical user interface (provided by the client device 116*a*)—such as a selection of a selectable option associated with the digital content item—the client device 116*a* requests from the social networking system 102 a messaging thread between the third party 112 and the user 122*a*. Upon making the request, the client device 116*a* launches the messaging application 120*a* to view the requested messaging thread. The social networking system 102 then provides the requested messaging thread to the client device 116*a* for presentation within a graphical user interface. Using a chatbot, the social networking system 102 generates automated messages within the messaging thread that prompt the user 122*a* to digitally signing a digital document, pay the third party 112, and/or add an email address to an email-distribution list.

Turning now to FIGS. 2A-2D and 3, these figures provide an overview of embodiments of the social networking system 102 that verify a user's identity and generate automated messages within a messaging thread to prompt the user to digitally sign a digital document, pay a third party, or join an email-distribution list. Specifically, FIGS. 2A-2D illustrate a representation of a sequence of acts 202-262 that the social networking system 102, the third-party device 106, or the client device 116*a* perform, such as sending a digital content item to add to a newsfeed for a user, providing a messaging thread, generating an automated message comprising a signature option, and verifying an identity of a user. Similarly, FIGS. 3A-3B illustrates a representation of a sequence of acts 302-324 that the social networking system 102, the third-party device 106, or the client device 116*a* perform, such as generating an automated message comprising a signature option, a payment option, and an email-distribution option; providing payment fields; and generating an automated message comprising an email address for a user.

Figure 2A:
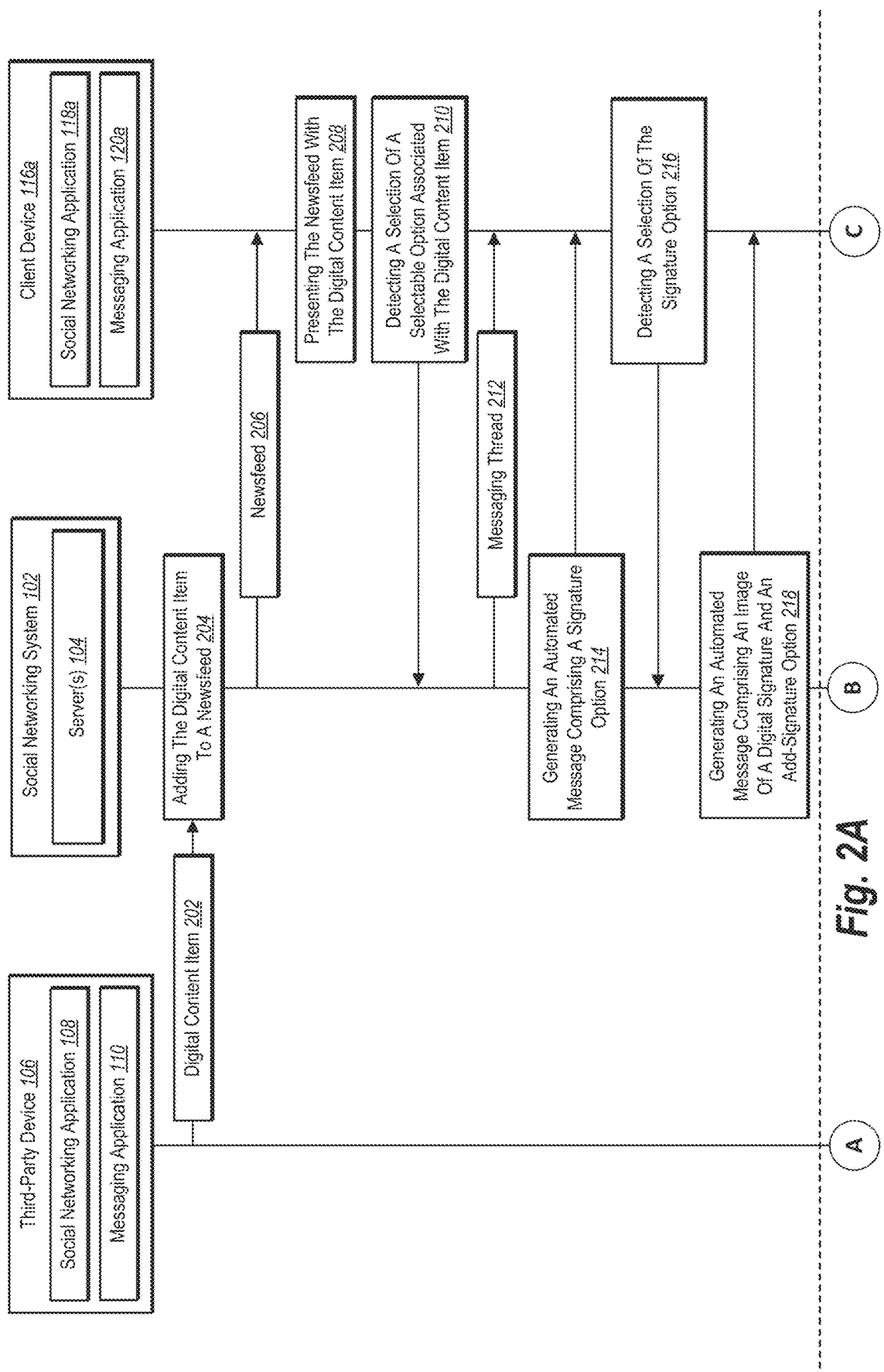
FIGS. 2A-2D illustrate a sequence-flow diagram of generating automated messages within a messaging thread for a verified user of a social networking system to digitally sign a digital document in accordance with one or more embodiments.
Figure 2B:
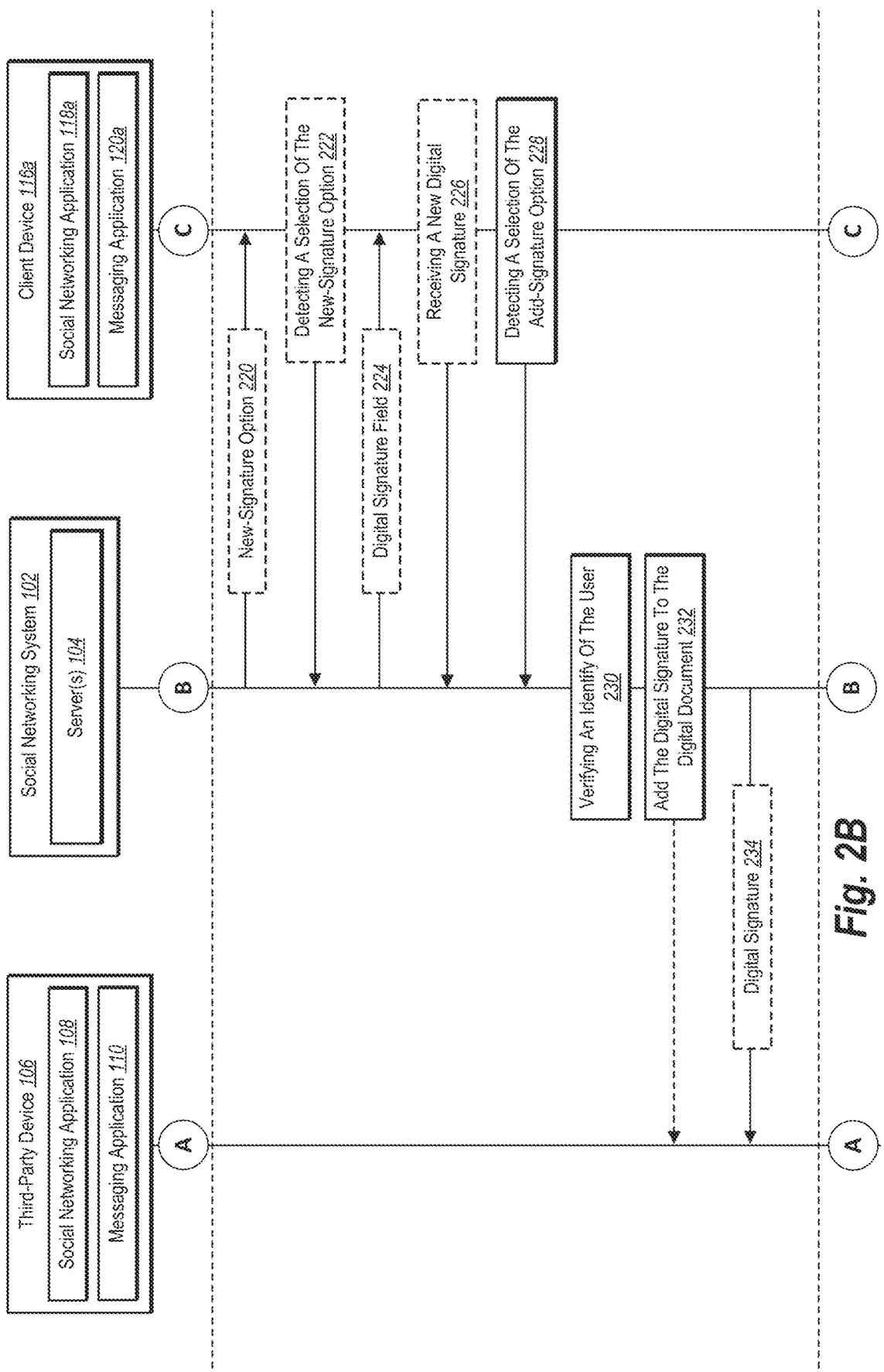
Figure 2C:
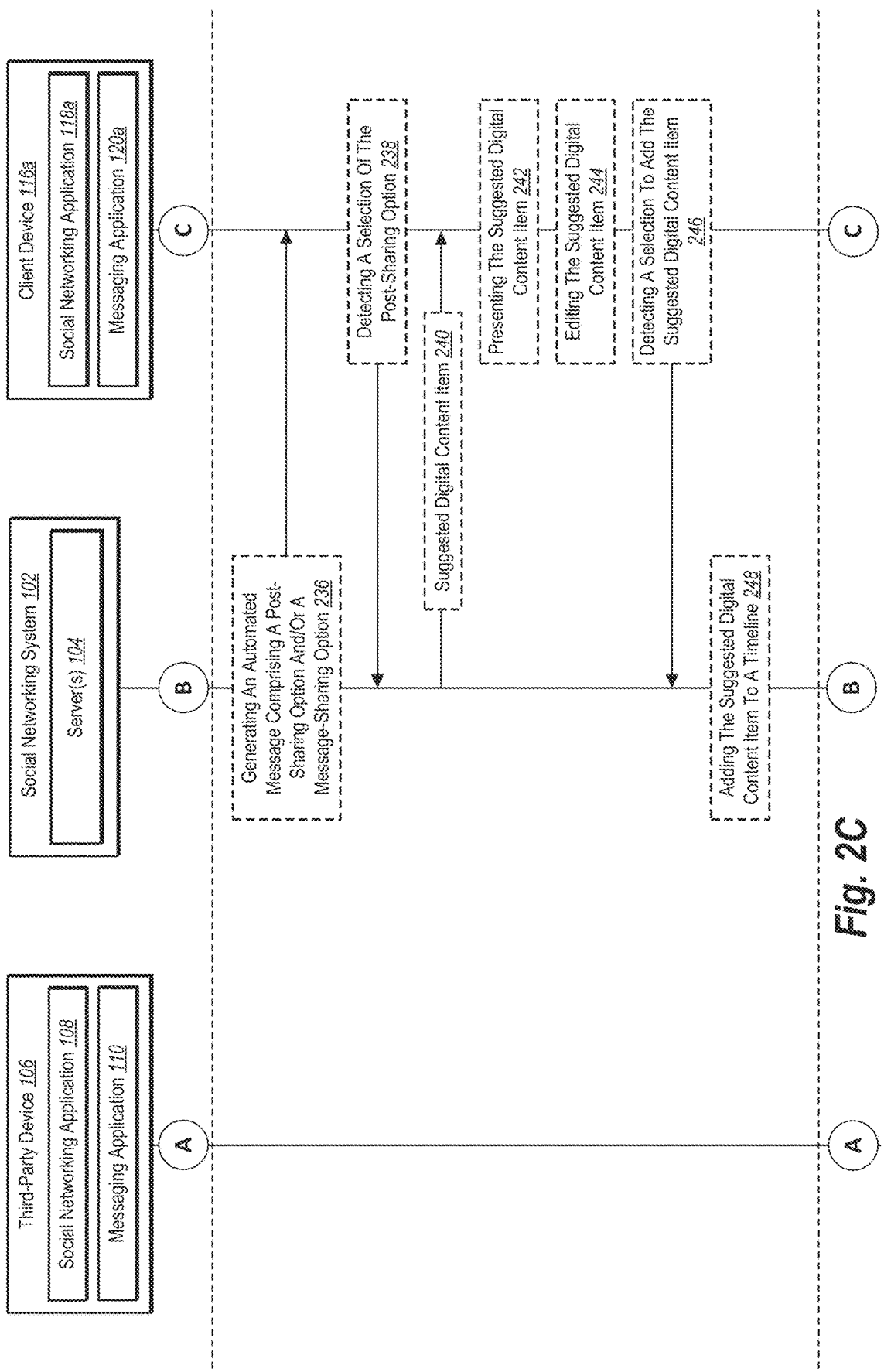
Figure 2D:
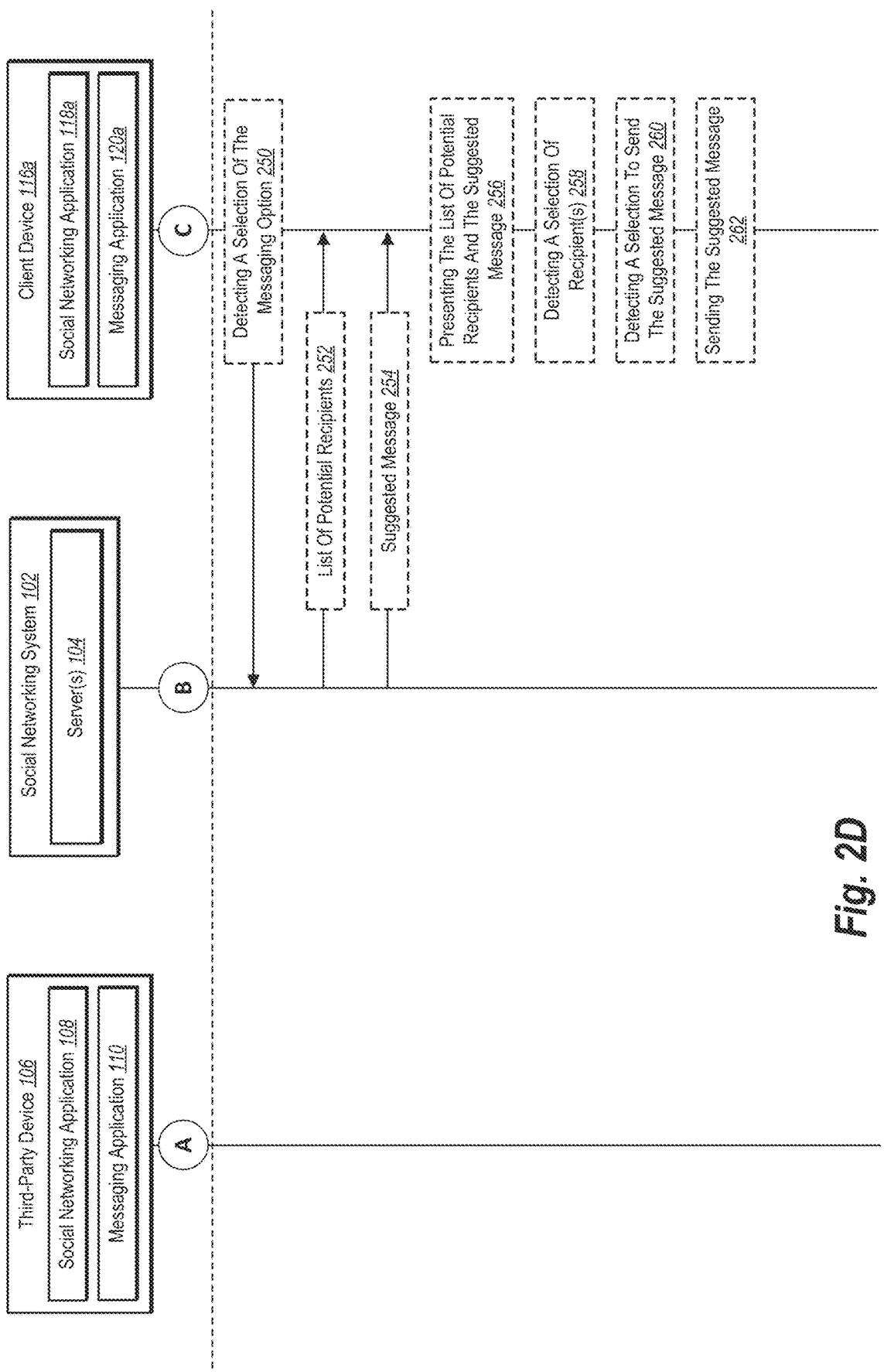
Figure 3A:
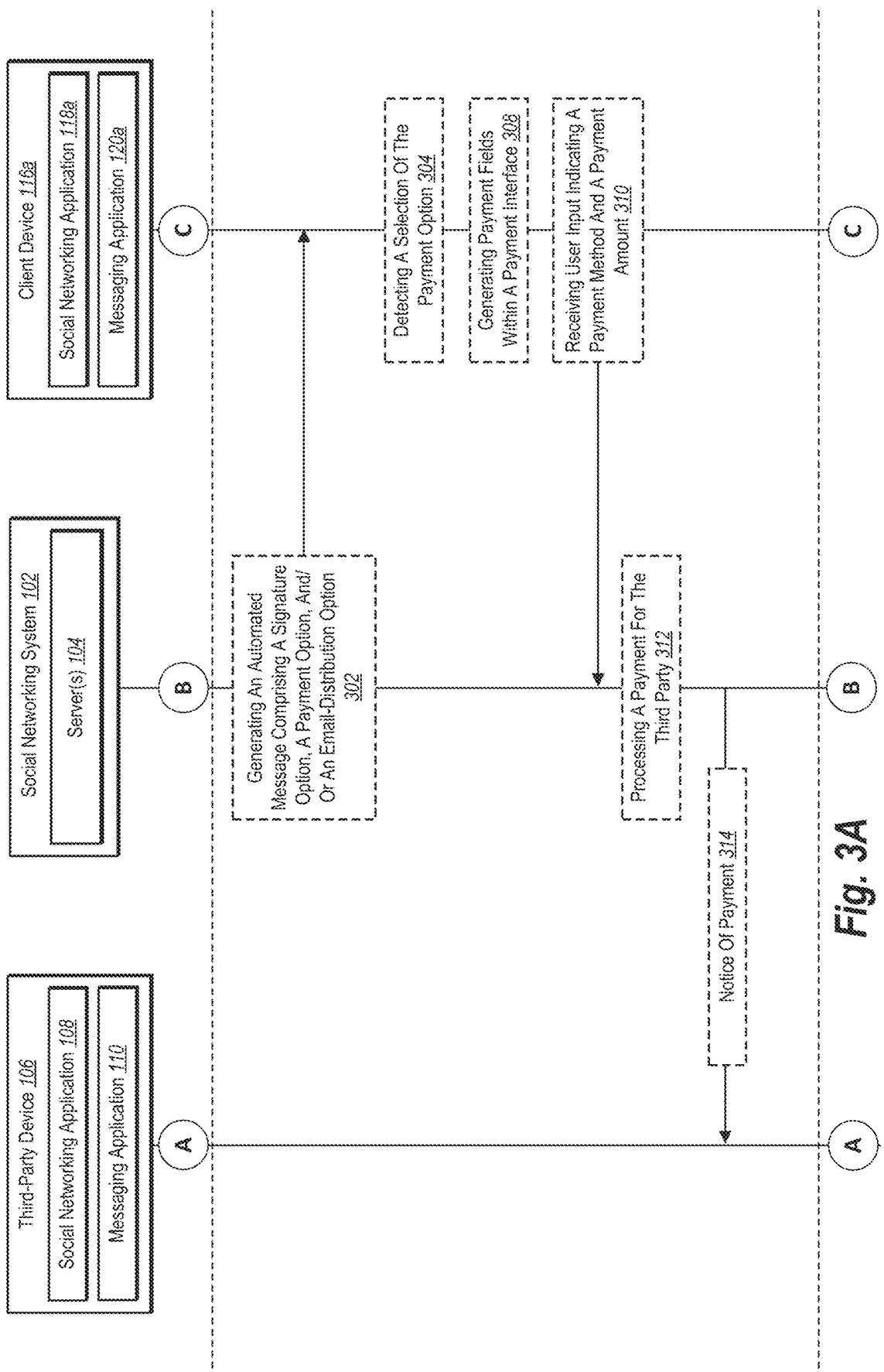
FIGS. 3A-3B illustrate a sequence-flow diagram of generating automated messages within a messaging thread for a verified user of a social networking system to pay a third party or join an email-distribution list in accordance with one or more embodiments.
Figure 3B:
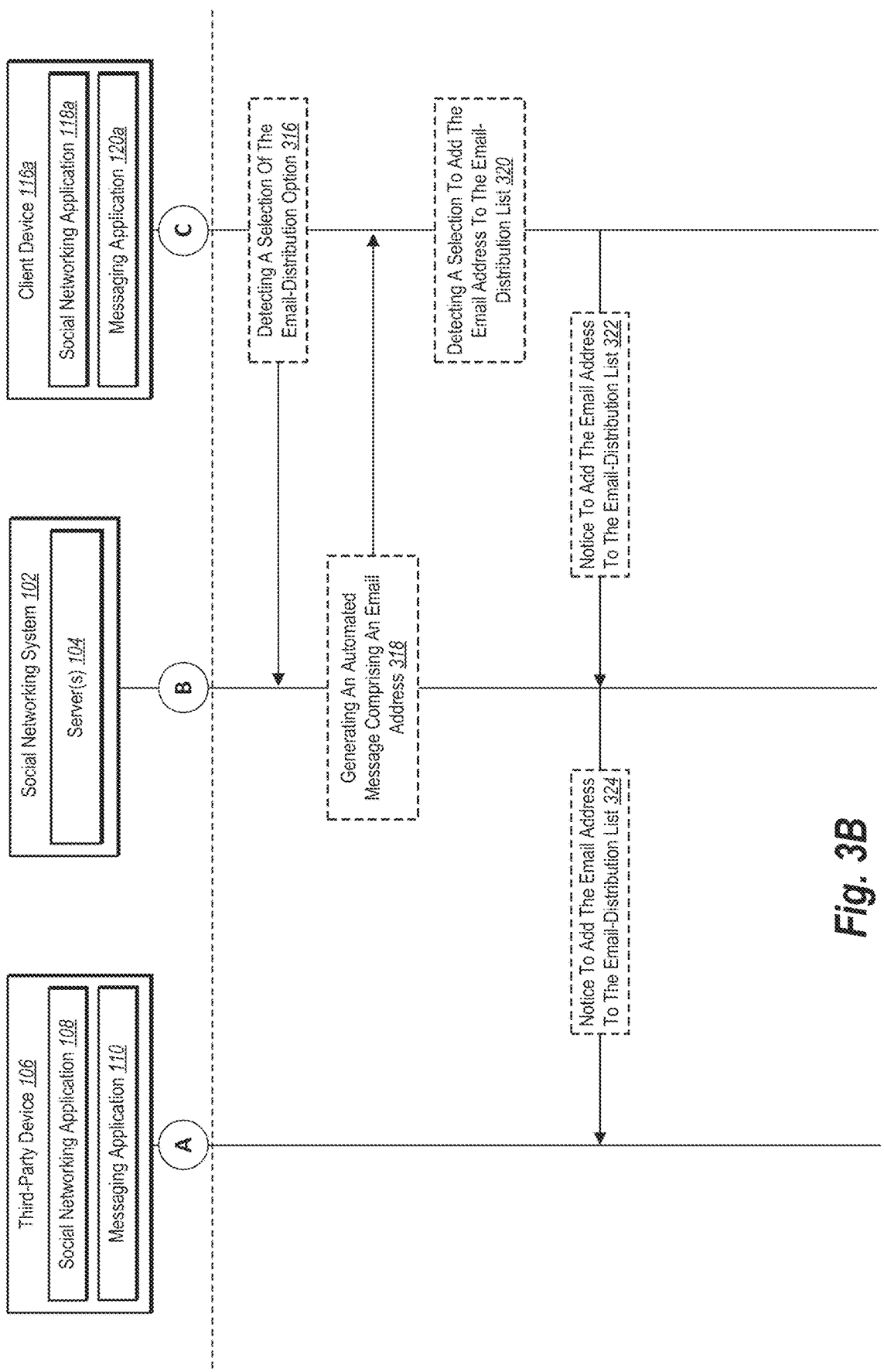

Various components of the system environment 100 perform the acts 202-262 shown in FIGS. 2A-2D or the acts 302-324 shown in FIGS. 3A-3B. In some embodiments, for example, the social networking system 102 comprises computer-executable instructions that cause the server(s) 104 to perform one or more of the acts 202-262 or the acts 302-324. Similarly, in certain embodiments, the social networking application 108 and the messaging application 110 comprise computer-executable instructions—and the social networking application 118*a* and the messaging application 120*a* comprise computer-executable instructions—that respectively cause the third-party device 106 or the client device 116*a* to perform one or more of the acts 202-262 or the acts 302-324. Rather than repeatedly describe the instructions within the social networking system 102 as causing the server(s) 104 to perform certain acts—or the instructions within the social networking applications 108 and 118*a* and the messaging applications 110 and 120*a* as causing the third-party device 106 or client device 116*a* to perform certain acts—this disclosure primarily describes the social networking system 102, the third-party device 106, or the client device 116*a* as performing the acts 202-262 and the acts 302-324 as a shorthand for those relationships.

Turning back now to FIGS. 2A-2D, as shown in FIG. 2A, the third-party device 106 performs the act 202 of sending a digital content item to the social networking system 102. The social networking system 102 in turn performs the act 204 of adding the digital content item to a newsfeed for the user 122*a* and the act 206 of providing the newsfeed to the client device 116*a*. For example, in some embodiments, the third-party device 106 sends a digital content item from the third party 112 to add to newsfeeds for users of the social networking system 102. Such a digital content item may include, for example, an image and text soliciting signatures for a petition supporting a cause, a video of a product with an accompanying text describing and promoting features of the product (e.g., clothing, computing device, vehicle, video game), or an image and an accompanying text promoting a service (e.g., an amusement park, hotel, video streaming service).

As noted above, in some embodiments, the social networking system 102 includes a selectable option associated with the digital content item. As used in this disclosure, the term "selectable option" refers to a call-to-action button, a selectable thumbnail, a selectable icon, a visible hyperlink, an invisible hyperlink, a radio button, or other option that (upon selection) triggers the social networking system 102 or a client device to perform an action. For example, when the client device 116a detects a selection of the selectable option associated with the digital content item, the client device 116a sends an indication of that selection to the social networking system 102, which in turn triggers the social networking system 102 to provide a messaging thread to the client device 116a.

Upon receipt of the digital content item for the third party 112, the social networking system 102 adds the digital content item to some (or all) newsfeeds for users of the social networking system 102. In some embodiments, for example, the social networking system 102 adds the digital content item as sponsored content to newsfeeds for users who satisfy certain demographic criteria, who have performed certain actions within the social networking system 102 (e.g., liking an organization's page, followed a particular user), or who are associated with a geographic location. In some such embodiments, the social networking system 102 adds the digital content item for a limited period of time specified by the third party 112 (e.g., a time period selected by the third party 112 for an advertising campaign on the social networking system 102).

As suggested by the act 206 in FIG. 2A, when the social networking system 102 receives a request from the client device 116a to access a newsfeed for the user 122a, the social networking system 102 provides the newsfeed to the client device 116a. For example, in some embodiments, the social networking system 102 sends digitally encoded data to the client device 116a that represents some or all of the digital content items within the newsfeed for the user 122a. These digital content items may include the digital content item for the third party 112. In some such embodiments, the social networking system 102 sends digitally encoded data to the client device 116a that represent the most recently added digital content items for the newsfeed, including the digital content item for the third party 112.

As noted above, the social networking system 102 provides the newsfeed to the client device 116a with the digital content item from the third party 112. As shown in FIG. 2A, the client device 116a performs the act 208 of presenting the newsfeed with the digital content item and the act 210 of detecting a selection of a selectable option associated with the digital content item. For example, in some embodiments, the client device 116a presents within a graphical user interface a newsfeed that includes social networking activity and the digital content item for the third party 112. When presenting a newsfeed, the client device 116a may, for instance, present the digital content item together with an associated selectable option. In some embodiments, the client device 116a presents a call-to-action button that prompts the user 122a to sign a petition, support a cause, purchase a product or service, or find out more information concerning a cause, product, or service. As part of the act 210, the client device 116a detects a selection by the user 122a of the selectable option associated with the digital content item. As further shown in FIG. 2A, the client device 116a then sends an indication of the selection of the selectable option to the social networking system 102. For example, in certain embodiments, the client device 116a sends data encoded to indicate a selection by the user 122a of the selectable option.

This indication that the user 122a selected the selectable option triggers the social networking system 102 to provide a messaging thread to the client device 116a. As shown in FIG. 2A, the social networking system 102 performs the act 212 of providing a messaging thread to the client device 116a. In some embodiments, for example, the social networking system 102 provides data packets including instructions that, when executed by the client device 116a, cause the client device 116a to launch or open the messaging application 120a. In some such embodiments, the instructions further cause the client device 116a to open a messaging thread between the user 122a and the third party 112. As explained below, the messaging thread may further include an automated message generated by a chatbot from the third party 112.

When the client device 116a is a mobile computing device, for example, the instructions from the social networking system 102 optionally cause the client device 116a to transition from presenting a graphical user interface for one mobile-software application (e.g., the social networking application 118a) that includes the newsfeed to presenting a graphical user interface for another mobile-software application (e.g., the messaging application 120a) that includes the messaging thread. This and other transitions are examples of how the social networking system 102 avoids the problems of some existing social networking systems by transitioning from a more visible digital forum to a private, one-on-one digital forum where a verified user may exchange sensitive information with a third party.

By contrast, in some embodiments, the social networking system 102 provides data packets including instructions that, when executed by the client device 116a, cause the client device 116a to present a graphical user interface for the messaging application 120a as an overlay on a graphical user interface for the social networking application 118a. For example, in some such embodiments—where both the social networking application 118a and messaging application 120a comprise one or more web browsers—the client device 116a transitions from presenting a first graphical user interface for the social networking application 118a to additionally presenting a second graphical user interface for the messaging application 120a as an overlay on the first graphical user interface. In such embodiments, the selectable option triggers the client device 116a to transition from a web browser comprising a newsfeed for the user 122a to overlaying a messaging thread for the user 122a and the third party 112 within a graphical user interface for the web browser.

FIG. 2A depicts the social networking system 102 providing the messaging thread in response to receiving an indication of a selection of a certain selectable option associated with a digital content item. But the social networking system 102 optionally provides the messaging thread independent of such an indication. For example, in some embodiments, the social networking system 102 may provide a messaging thread between the user 122a and the third party 112 in response to a selection by the user 122a to view the messaging thread from within an inbox of the messaging application 120a. In some such cases, a graphical user interface of the messaging application 120a includes an inbox for the user 122a that indicates a message received from the third party 112. In other words, in some embodiments, the third party 112 may initiate contact with the user 122a when, for example, the third party 112 and the user 122a have previously exchanged messages within the messaging thread.

Regardless of how the social networking system 102 provides the messaging thread, in some embodiments, a chatbot represents the third party 112 within the messaging thread. In some instances, the social networking system 102 uses the open source Artificial Linguistic Internet Computer Entity ("ALICE") engine and the open source Artificial Intelligence Mark Language ("AIML") to train the chatbot to generate automated messages for the third party 112. Alternatively, in other embodiments, the social networking system 102 uses Facebook's Wit.ai platform to train the chatbot to generate automated messages for the third party 112. To take but one example, the social networking system 102 trains the chatbot to generate automated messages that prompt the user 122a to digitally sign a digital document. Examples of such automated messages are described below, including automated messages that comprise signature options and images of digital signatures.

As shown in FIG. 2A, the social networking system 102 performs the act 214 of generating an automated message comprising a signature option to digitally sign a digital document. In some embodiments, for instance, the social networking system 102 generates an automated message within the messaging thread that refers to (or includes a text for) a digital document, a hyperlink to a digital document, or a downloadable file for a digital document. Alternatively, in some embodiments, the social networking system 102 generates an automated message within the messaging thread that refers to a digital document by a name or representation, such as by referring by name or visual representation to a digital document within the digital content item for the third party 112 or to a web site or native application that includes the digital document.

Regardless of whether or how an automated message includes or refers to a digital document, the social networking system 102 generates an automated message comprising a signature option to digitally sign the digital document as part of (or separate from) the automated message referring to the digital document. As indicated by FIG. 2A, the social networking system 102 further sends the automated message to the client device 116a for display within a graphical user interface. In some embodiments, the signature option comprises a selectable option that (upon selection) triggers the social networking system 102 to provide tools for the user 122a to digitally sign the digital document. In some instances, the signature option includes a text, image, or other indicator that prompts or requests the user 122a to sign the digital document. As described further below with reference to FIGS. 3A-3B, in certain embodiments, the automated message may include additional selectable options.

After presenting the automated message comprising the signature option, the client device 116a performs the act 216 of detecting a selection of the signature option. As shown in FIG. 2A, upon detection, the client device 116a sends an indication of the selection of the signature option to the social networking system 102. For example, in certain embodiments, the client device 116a sends data encoded to indicate a selection by the user 122a of the signature option. This indication triggers the social networking system 102 to provide tools for digitally signing the digital document.

As further shown in FIG. 2A, the social networking system 102 performs the act 218 of generating an automated message comprising an image of a digital signature and an add-signature option. As indicated by the arrow associated with the act 218, the social networking system 102 also sends the automated message to the client device 116a for presentation within a graphical user interface. In some embodiments, the image of the digital signature comprises a preloaded image of a previous digital signature, such as a digital signature previously digitally drawn by the user 122a. Alternatively, in some embodiments, the social networking system 102 generates an image of a digital signature based on a name designated for an account of the user 122a for the social networking system 102. For example, the social networking system 102 may generate an image of stylized or plain text of the name designated for the account of the user 122a.

In addition to the image of the digital signature, the automated message comprises an add-signature option. As suggested by its name, upon selection, the add-signature option triggers the social networking system 102 to add a digital signature for the user 122a to the digital document. In some instances, the add-signature option indicates (by text, image, or other indicator) that upon selecting the add-signature option, the signature of the user 122a will be added to the digital document. Alternatively, the add-signature option indicates (by text, image, or other indicator) that upon selecting the add-signature option, the digital document will be digitally signed on behalf of the user 122a. In certain embodiments, the add-signature option further indicates to the user 122a that selecting the add-signature option confirms that the image of the digital signature represents a digital signature for the user 122a.

The social networking system 102, however, also optionally provides options to change, edit, or add a new signature. As shown in FIG. 2B, the social networking system 102 optionally performs the act 220 of providing a new-signature option to the client device 116a. The client device 116a in turn optionally performs the act 222 of detecting a selection of the new-signature option. Similar to some of the options described above, the new-signature option is a selectable option. The new-signature option triggers the social networking system 102 to provide tools for the user 122a to attach, create, link, or upload a digital signature that differs from the image of the digital signature initially presented to the user 122a by the social networking system 102. In some embodiments, the social networking system 102 provides the new-signature option as part of the automated message comprising the image of the digital signature for the user 122a. In other words, in some embodiments, the social networking system 102 generates an automated message comprising an image of a digital signature, an add-signature option, and a new-signature option.

As suggested by FIG. 2B, when the client device 116a detects a selection by the user 122a of the new-signature option, the client device 116a sends an indication of the selection of the new-signature option to the social networking system 102. For example, in certain embodiments, the client device 116a sends data encoded to indicate a selection by the user 122a of the new-signature option. This indication that the user 122a selected the new-signature option triggers the social networking system 102 to provide tools for the user 122a to create or add a new digital signature.

As shown in FIG. 2B, for example, the social networking system 102 optionally performs the act 224 of providing a digital signature field. In some cases, the social networking system 102 generates the digital signature field within the messaging thread. The term "digital signature field" refers to a digital space in which a user attaches, inputs, links, or uploads a digital signature. For example, in some embodiments, a digital signature field comprises a digital space in which the client device 116a renders strokes drawn by the user 122a on a touch screen or other computer interface of the client device 116a to create a digital signature. Additionally, or alternatively, in some embodiments, a digital signature field comprises a digital space in which the client device 116a renders an image of a digital signature attached, linked, or uploaded by the user 122a to the client device 116a.

As further shown in FIG. 2B, after the social networking system 102 provides the digital signature field, the client device 116a optionally performs the act 226 of receiving a new digital signature. In some embodiments, for example, the messaging application 120a comprises computer-executable instructions that, when executed by the client device 116a, cause the client device 116a to detect a signature input by a keyboard, mouse, stylus, or touch gesture. While some such digital signatures may be input as a drawing or with strokes, other digital signatures may be input as a code or text. Additionally, or alternatively, in some embodiments, the messaging application 120a comprises computer-executable instructions that, when executed by the client device 116a, cause the client device 116a to detect a file attached, uploaded, or linked by the user 122a within the digital signature field. In some such embodiments, the digital signature field includes within (or has the social networking system 102 populate nearby) a selectable option to attach, upload, or link an image of a digital signature within the messaging thread. Upon receipt of the new digital signature, the client device 116a sends the image or other file comprising the new digital signature to the social networking system 102.

Independent of whether the user 122a uses an image of a digital signature from the social networking system 102 or inputs a new digital signature, the social networking system 102 facilitates the user 122a in adding the digital signature to the digital document. As shown in FIG. 2B, the client device 116a performs the act 228 of detecting a selection of the add-signature option. In some embodiments, by detecting a selection of the add-signature option, the client device 116a receives a confirmation from the user 122a that the image of the digital signature from the social networking system 102 represents a digital signature for the user 122a. In some such instances, for example, the client device 116a receives a confirmation from the user 122a that a preloaded image of a previous digital signature (or an automatically generated digital signature) represents a signature of the user 122a.

When the client device 116a receives a new digital signature, however, detecting a selection of the add-signature option represents something different. In some embodiments, by detecting a selection of the add-signature option, the client device 116a receives a confirmation from the user 122a that the new digital signature represents a digital signature for the user 122a. Regardless of whether the detection refers to a digital signature received from the social networking system 102 or a new digital signature, by detecting a selection of the add-signature option, the client device 116a receives an indication from the user 122a to add a digital signature to the digital document.

As noted above, in addition to providing a messaging thread and signature options, the social networking system 102 verifies a user's identity. As shown in FIG. 2B, for example, the social networking system 102 performs the act 230 of verifying an identity of the user 122a. In some embodiments, the social networking system 102 compares a username and password to a username and password associated with an account of the user 122a. Additionally, or alternatively, in certain embodiments, the social networking system 102 compares a location of the client device 116a and a device identifier of the client device 116a to locations and device identifiers of one or more client devices tracked within a user history for the user 122a.

For example, in some embodiments, the social networking system 102 compares coordinates or a location identifier from a Global Positioning System ("GPS"), Assisted GPS, synthetic GPS, a Cell ID, Wi-Fi fingerprint, or Bluetooth beacon, on the one hand, to a same type of coordinates or identifier in a user history of the social networking system 102 for the user 122a, on the other hand. Relatedly, in some embodiments, the social networking system 102 compares a device fingerprint, a browser fingerprint, an internal or external Internet Protocol ("IP") address, or an IP address for a network to which the client device 116a is connected, on the one hand, to a same type of fingerprint or address in a user history of the social networking system 102 for the user 122a, on the other hand.

Additionally, or alternatively, in some embodiments, the social networking system 102 further determines whether the user 122a is a real or fictitious person based on social networking activity and profile information associated with an account of the user 122a for the social networking system 102. For example, in some embodiments, the social networking system 102 determines one or more of (a) whether an account of the user 122a includes a real image or another image available on the Internet (e.g., a stock image), (b) whether the account is connected to contacts or "friends" who are also connected to each other through the social networking system 102 (e.g., whether the account is connected to "mutual friends"), (c) whether a timeline associated with the account has posted photos of a person and how many such photos are posted on the timeline, (d) a number of pages followed or liked by the user 122a, (e) a number of comments, reactions (e.g., likes, emoji reactions), or shares by the user 122a associated with social networking posts of contacts or friends, (f) a number of fields with information within profile information associated with the account, (g) a number of birthday wishes posted on a timeline associated with the account, (h) a regularity of signing in to the account (e.g., a sign in every day, week, or month), or (i) a time since the account was created for the user 122a.

In one or more embodiments, the social networking system 102 assigns a score to one or more of the factors (a) through (i) to determine whether the user 122a is a real or fictitious person. In such embodiments, when a cumulative score accounting for each considered factor exceeds a threshold cumulative score, the social networking system 102 determines that the user 122a is likely a real person. By contrast, when a cumulative score accounting for each considered factor falls below a threshold cumulative score, the social networking system 102 determines that the user 122a is likely a fictitious person.

Although FIGS. 2A-2B depict the social networking system 102 as verifying an identity of the user 122a after providing a newsfeed and a messaging thread for the user 122a, in some embodiments, the social networking system 102 verifies an identity of the user 122a at any point before adding a digital signature to the digital document. For example, in some embodiments, the social networking system 102 verifies an identity of the user 122a when the client device 116a launches the social networking application 118a or the messaging application 120a.

In addition to verifying an identity of users, in some embodiments, the social networking system 102 also adds a digital signature to a digital document. As further shown in FIG. 2B, the social networking system 102 performs the act 232 of adding the digital signature to the digital document. In some embodiments, the social networking system 102 adds the digital signature based on receiving an indication of a selection of the add-signature option and verifying the identity of the user 122a.

The social networking system 102 may add the digital signature to the digital document in a variety of ways. For example, in some embodiments, the social networking system 102 adds the digital signature to a digital document stored by the social networking system 102 for the third party 112. In such embodiments, the social networking system 102 may, for example, add an image of the digital signature to the digital document, such as by superimposing the image onto the digital document or by adding the image to a digital field for signatures; add a code representing the digital signature to the text of the digital document, such as by adding a code that represents the digital signature or a unique identifier that identifies the image; or attach the image of the digital signature to the digital document, such as by attaching an additional digital signature page referencing the digital document.

As indicated by the arrow for the act 232 in FIG. 2B, in some embodiments, the social networking system 102 optionally sends the digital signature or an image of the digital signature to the third-party device 106. In some embodiments, for instance, the social networking system 102 primarily transfers the digital signature or image of the digital signature to the third-party device 106 for the third party 112 to add to the digital document. Accordingly, in some such cases, while the social networking system 102 stores a version of the digital document, the third party 112 adds the digital signature to the digital document.

In addition to adding the digital signature to the digital document, in certain embodiments, the social networking system 102 performs the act 234 of sending the digital signature to the third-party device 106. In some cases, for instance, the social networking system 102 sends the digital document with the digital signature to the third-party device 106. Alternatively, in certain instances, the social networking system 102 sends a notice to the third-party device 106 that the digital signature has been added to the digital document stored by the social networking system 102. For embodiments in which the third party 112 adds the digital signature, the social networking system 102 sends the digital signature or image of the digital signature to the third-party device 106 for the third party 112 to add to the digital document.

As noted above, in addition to adding a digital signature to a digital document, in certain embodiments, the social networking system 102 provides selectable options within the messaging thread for the user 122a to share her support for the third party 112 with other users in various digital forums of the social networking system 102. As shown in FIG. 2C, for example, the social networking system 102 optionally performs the act 236 of generating an automated message comprising a post-sharing option and/or a message-sharing option. As further indicated by the arrow associated with the act 236, the social networking system 102 generates this automated message within the message thread and sends the automated message to the client device 116a.

Both the post-sharing option and the message-sharing options are selectable options. In some embodiments, the post-sharing option includes a text, image, or other indicator that prompts or requests the user 122a to post a suggested digital content item to a timeline indicating that the user supports the third party 112. Similarly, the message-sharing option includes a text, image, or other indicator that prompts or requests the user 122a to notify other users using suggested messages in messaging threads that the user 122a supports the third party 112. In some instances, the post-sharing option and message-sharing option facilitate actions that prompt digital signatures from other users of the digital document.

As further shown in FIG. 2C, after receiving the automated message comprising the post-sharing option, the client device 116a optionally performs the act 238 of detecting a selection of the post-sharing option. In response to receiving an indication of that selection, the social networking system 102 optionally performs the act 240 of providing a suggested digital content item to the client device 116a.

The suggested digital content item may be any digital image, photo, text, symbol, video, file, or any combination thereof that indicates the user 122a supports the third party 112. For example, in some embodiments, the suggested digital content item includes an image or video representing a cause and a text indicating that the user 122a digitally signed a digital document associated with the third party 112, such as by digitally signing a petition or pledge. By contrast, in some embodiments, the suggested digital content item comprises an image or video of a product or service and a text indicating that the user 122a purchased the product or service from the third party 112. In some such embodiments, the image, video, or text do not specifically reference a digital document, such as by omitting mention of a contract or agreement.

Additionally, in certain embodiments, the suggested digital content item includes an associated selectable option that (upon selection) triggers the social networking system 102 to provide to a client device a messaging thread between the selecting user and the third party 112. In other words, the selectable option triggers the social networking system 102 to generate automated messages within a messaging thread that prompt the selecting user to digitally sign a digital document for the third party 112.

Regardless of the format of (or communication within) the suggested digital content item, the social networking system 102 sends the suggested digital content item to the client device 116a for presentation. As shown in FIG. 2C, the client device 116a optionally performs the act 242 of presenting the suggested digital content item. In some embodiments, the messaging application 120a or the social networking application 118a include computer-executable instructions that, when executed by the client device 116a, cause the client device 116a to present the suggested digital content item in a format for posting on a timeline or newsfeed for the user 122a. In other words, the client device 116a presents the suggested digital content item in a format that previews how the suggested digital content item would appear to another user within a timeline or newsfeed.

In addition to presenting the suggested digital content item, in some embodiments, the client device 116a further enables the user 122a to edit the suggested digital content item. As shown in FIG. 2C, the client device 116a optionally performs the act 244 of editing the suggested digital content item. For example, in some instances, the messaging application 120a or the social networking application 118a include computer-executable instructions that, when executed by the client device 116a, cause the client device 116a to present options to edit a digital image, photo, text, symbol, video, or file within the suggested digital content item. By contrast, in some embodiments, the instructions prohibit or limit editing of the suggested digital content item. For example, the client device 116a optionally limits the user 122a to editing only a portion of a text within the suggested digital content item.

Regardless of whether the user 122a edits the suggested digital content item, the client device 116a optionally performs the act 246 of detecting a selection to add the suggested digital content item. In response to receiving an indication of that selection, the social networking system 102 optionally performs the act 250 of adding the suggested digital content item to a timeline. For example, in certain embodiments, the client device 116a receives a confirmation from the user 122a to post the suggested digital content item to a timeline of the user 122a. The client device 116a then sends to the social networking system 102 data encoded to indicate a confirmation from the user 122a to add the suggested digital content item. The social networking system 102 in turn posts the suggested digital content item to a timeline of the user 122a. Alternatively, the client device 116a receives and sends a confirmation from the user 122a to add an edited version of the suggested digital content item to a timeline of the user 122a, and the social networking system 102 posts the edited version to a timeline of the user 122a.

As shown in FIG. 2D, in addition to processing the post-sharing option, the client device 116a optionally performs the act 250 of detecting a selection of the message-sharing option. In response to receiving an indication of that selection, the social networking system 102 optionally performs the act 252 of providing a list of potential recipients to the client device 116a and the act 254 of providing a suggested message to the client device 116a. For example, in some embodiments, the social networking system 102 provides a list of users with whom the user 122a is connected through the social networking system 102 as potential recipients of the suggested message, such as a list of friends or followers of the user 122a. In certain embodiments, the social networking system 102 provides the list of potential recipients with a selectable option for each potential recipient to be added as an addressee of a message within an additional messaging thread.

Similar to the suggested digital content item, the suggested message may be a digital image, photo, text, symbol, video, file, or any combination thereof that indicates the user 122a supports the third party 112. For example, in certain embodiments, the suggested message comprises a thumbnail for the digital document and a text indicating that the user 122a digitally signed the digital document associated with the third party 112. By contrast, in some embodiments, the suggested message comprises an image or video of a product or service and a text indicating that the user 122a purchased the product or service from the third party 112. In some such embodiments, the image, video, or text do not specifically reference a digital document, such as by omitting mention of a contract or agreement.

Additionally, in certain embodiments, the suggested message includes an associated selectable option that (upon selection) triggers the social networking system 102 to provide to a client device a messaging thread between the recipient of the suggested message and the third party 112. In other words, as above, the selectable option triggers the social networking system 102 to generate automated messages within a messaging thread that prompt the recipient of the suggested message to digitally sign a digital document for the third party 112.

As further shown in FIG. 2D, the client device 116a optionally performs the act 256 of presenting the list of potential recipients and the suggested message. In some embodiments, the client device 116a separately presents the list of potential recipients and the suggested message. In other embodiments, the client device 116a presents the list of potential recipients and the suggested message within a single graphical user interface.

As suggested above, in some embodiments, the client device 116a presents the list of potential recipients with a selectable option for each potential recipient. In such embodiments, the selectable option prompts the client device 116a to add the selected recipient as an addressee of the suggested message within an additional messaging thread. In one such embodiment, the messaging application 120a includes computer-executable instructions that, when executed by the client device 116a, cause the client device 116a to present an address book of users with whom the user 122a is connected through the social networking system 102, such as a list of friends or followers of the user 122a. The user 122a could select one or more of these users as an addressee for the suggested message.

In addition to presenting the suggested message, the client device 116a also includes options to edit the suggested message. For example, in some instances, the messaging application 120a includes computer-executable instructions that, when executed by the client device 116a, cause the client device 116a to present options to edit a digital image, photo, text, symbol, video, or file within the suggested message. By contrast, in some embodiments, the instructions prohibit or limit editing of the suggested message. For example, the client device 116a optionally limits the user 122a to editing only a portion of a text or deleting an image or video within the suggested message.

As further shown in FIG. 2D, after presenting the list of potential recipients and the suggested message, the client device 116a performs a set of acts that culminates in sending the suggested message. Specifically, the client device 116a optionally performs the act 258 of detecting a selection of recipient(s), the act 260 of detecting a selection to send the suggested message, and the act 262 of sending the suggested message. As suggested above, the client device 116a detects a selection by the user 122a of recipient(s) from the list of potential recipients or from independent input by the user 122a. As for the latter input, the client device 116a optionally detects input of a name or address of a user of the social networking system 102 as a recipient of the suggested message.

Upon detecting a selection by the user 122a to send the suggested message to the selected recipient(s), the client device 116a sends the suggested message. As suggested above, the client device 116a may send an edited or unedited version of the suggested message. Although not shown in FIG. 2D, upon receipt of the suggested message from the client device 116a, the social networking system 102 generates (or adds) the suggested message within an additional messaging thread between the user 122a and the selected recipient(s).

Turning back now to FIGS. 3A-3B, this figure illustrates a representation of a sequence of acts 302-324 that the social networking system 102, the third-party device 106, or the client device 116a perform in the alternative (or in addition) to the acts 214-234 shown in FIGS. 2A-2B. As alternative or additional acts, FIGS. 3A-3B illustrates options provided by the social networking system 102 that facilitate paying the third party 112 within a messaging thread and adding an email address of the user 122a to an email-distribution list.

As shown in FIG. 3A, the social networking system 102 optionally performs the act 302 of generating an automated message comprising a signature option, a payment option, and/or an email-distribution option. In comparison to the automated message generated as part of the act 214 shown in FIG. 2A, the automated message generated as part of the act 302 includes additional options—the payment option and/or the email-distribution option. This disclosure describes each of the payment option and the email-distribution option in turn. In some embodiments, the payment option comprises a selectable option that (upon selection) triggers the social networking system 102 to provide tools for paying the third party 112. In some instances, the payment option includes a text, image, or other indicator that prompts or requests the user 122a to pay the third party 112.

Regardless of the form of the payment option, the corresponding payment to the third party 112 may be for different purposes. For example, in some embodiments, the payment comprises a donation to the third party 112. In other embodiments, the payment comprises compensation paid to the third party 112 in exchange for a product or service.

As indicated by the arrow associated with the act 302, the social networking system 102 sends the automated message to the client device 116a for presentation within a graphical user interface. As further shown in FIG. 3A, after receiving the automated message comprising the payment option, the client device 116a optionally performs the act 304 of detecting a selection of the payment option. In response to detecting that selection, the client device 116a optionally performs the act 308 of generating payment fields within a payment interface and the act 310 of receiving user input indicating a payment method and a payment amount.

As used in this disclosure, the term "payment field" refers to a digital field in which payment information is input. For example, a payment field may comprise a digital field for entering a credit or debit card number, a card security code, an expiration date, or a cardholder name. As another example, a payment field may comprise a digital field for entering in a payment amount. Relatedly, a "payment interface" refers to a graphical user interface for entering or processing payment information. The payment interface may be a graphical user interface for Facebook's Messenger Pay or a third-party payment service.

For example, in some embodiments, the client device 116a generates payment fields with a prepopulated credit or debit card number, an expiration date, and/or a cardholder name within a payment interface based on payment information saved by the social networking system 102. Additionally, in some embodiments, the client device 116a generates a payment field for a payment amount and a payment field for a credit security code.

When performing the act 310, in some embodiments, the client device 116a receives user input comprising a confirmation from the user 122a that the payment fields include a proper payment method (e.g., by selection of a selectable option), user input indicating a payment amount (e.g., by selection of a selectable option or text entry), and user input indicating a credit security code (e.g., by text entry). In addition, the client device 112a optionally receives user input confirming that the user 122a has selected an option to proceed with the payment using the entered payment information.

Additionally, or alternatively, in some embodiments, the client device 116a generates payment fields for a credit or debit card number, an expiration date, a cardholder name, a credit security code, and a payment amount within a payment interface, but without any prepopulated payment information. In some such embodiments, the client device 116a receives user input comprising entries from the user 122a for the credit or debit card number, expiration date, cardholder name, credit security code, and payment amount (e.g., by text entry). In addition, the client device 112a optionally receives user input confirming that the user 122a has selected an option to proceed with the payment using the entered payment information.

As indicated by the arrow associated with the act 310, after receiving a confirmation from the user 122a, the client device 116a sends payment information to the social networking system 102 for processing. For example, in some embodiments, the client device 116a sends (and the social networking system 102 receives) an indication of a donation amount and a payment method and an indication of a confirmation from the user 122a. In some such embodiments, the client device 116a sends (and the social networking system 102 receives) digitally encoded data that communicates a donation amount, a payment method, and a selection of a confirmation option by the user 122a.

As further shown in FIG. 3A, after receiving payment information and confirmation from the client device 116a, the social networking system 102 performs the act 312 of processing a payment for the third party 112. For example, the social networking system 102 may process a donation from the user 122a for the third party 112 using a donation amount and a payment method entered within the payment fields. When processing the payment, the social networking system 102 optionally uses the methods and systems disclosed in Facilitating Sending and Receiving of Payments Using Message-Based Contextual Prompts, U.S. patent application Ser. No. 14/524,380, filed 27 Oct. 2014; Facilitating Same Day Payment Transactions, U.S. patent application Ser. No. 14/572,275, filed 16 Dec. 2014; Facilitating Sending and Receiving of Peer-to-Business Payments, U.S. patent application Ser. No. 14/577,410, filed 19 Dec. 2014; or Facilitating Sending and Receiving of Peer-to-Peer Payments, U.S. patent application Ser. No. 14/525,008, filed 27 Oct. 2014, each of which is incorporated in its entirety by reference.

In addition to processing a payment, in some embodiments, the social networking system 102 notifies the third party 112 of the payment from the user 122a. As shown in FIG. 3A, the social networking system 102 optionally performs the act 314 of sending a notice of payment to the third-party device 106. For example, in some embodiments, the social networking system 102 generates an automated message within the messaging thread between the third party 112 and the user 122a comprising a text notifying the third party 112 of the payment. The social networking system 102 sends this automated message to the third-party device 106. Alternatively, in some embodiments, the social networking system 102 sends an email to the third-party device 106 notifying the third party 112 of the payment.

As noted above, in addition to the payment option, in some embodiments, the social networking system 102 generates an automated message comprising an email-distribution option. The email-distribution option comprises a selectable option that (upon selection) triggers the social networking system 102 to provide tools for adding an email address to an email-distribution list of the third party 112. By adding an email address to the email-distribution list, the user 122a chooses to receive emails from the third party 112. In some instances, the email-distribution option includes a text, image, or other indicator that prompts or requests the user 122a to add an email address to an email-distribution list of the third party 112.

As shown in FIG. 3B, the client device 116a optionally performs the act 316 of detecting a selection of the email-distribution option. In response to receiving an indication of that selection, the social networking system 102 optionally performs the act 318 of generating an automated message comprising an email address. As indicated by the arrow associated with the act 318, the social networking system 102 sends the automated message comprising the email address to the client device 116a for presentation within a graphical user interface.

When generating an automated message as part of the act 318, in some embodiments, the social networking system 102 generates a suggested message within the messaging thread for the user 122a to send to the third party 112. The suggested message indicates that the user 122a has selected to add her email address to the email-distribution list of the third party 112. As described below, FIG. 4G includes an example of a suggested message.

Regardless of the format of the automated message, in some embodiments, the client device 116a generates an automated message comprising an email address associated with an account of the user 122a for the social networking system 102. The email address may, for example, be designated by the user 122a within the profile information of the social networking system 102. As another example, in some embodiments, the email address may be associated with an account of the user 122a for the messaging application 120a.

As further shown in FIG. 3B, the client device 116a optionally performs the act 320 of detecting a selection to add the email address to the email-distribution list. For example, in some embodiments, the client device 116a detects a selection by the user 122a to send the suggested message to the third-party device 106. Alternatively, in some embodiments, the client device 116a detects a selection by the user 122a of a selectable option to send a notice to the third-party device 106 for the third party 112 to add the email address to the email-distribution list.

After detecting the selection to add the email address, the client device 116a optionally performs the act 322 of sending (to the social networking system 102) a notice to add the email address to the email-distribution list. In response to receiving the notice, the social networking system 102 performs the act 324 of sending (to the third-party device 106) the notice to add the email address to the email-distribution list. In some embodiments, the client device 116a (and the social networking system 102) send the suggested message described above indicating that the user 122a has selected to add her email address to the email-distribution list of the third party 112. By contrast, in some embodiments, the client device 116a (and the social networking system 102) send the email address to a designated email address for the third party 112.

Turning now to FIGS. 4A-4I, these figures generally illustrate user interfaces of the client device 116a presenting a newsfeed and automated messages within a messaging thread for a verified user to digitally sign a digital document, pay a third party, or join an email-distribution list. Consistent with the disclosure above, the social networking application 118a and the messaging application 120a each comprise computer-executable instructions that cause the client device 116a to perform tasks depicted in FIGS. 4A-4I. Rather than repeatedly describe the computer-executable instructions within the social networking application 118a or the messaging application 120a as causing the client device 116a to perform such tasks, this disclosure primarily describes the client device 116a as simply performing tasks as a shorthand for that relationship. Additionally, while this disclosure refers to touch gestures as examples of user interactions when describing 4A-4I, in additional or alternative embodiments, the client device 116a detects any suitable user interaction, including a mouse click, stylus interaction, or a keyboard input.

As shown in FIG. 4A, the client device 116a presents a newsfeed 412 within a graphical user interface 404 ("GUI 404") of a touch screen 402. Specifically, in response to the user 122a selecting a social-networking-application thumbnail (not shown) by touch gesture, the client device 116a initiates the social networking application 118a and requests a newsfeed for the user 122a. Upon receiving that request, the social networking system 102 provides the newsfeed 412 comprising digital content items to the client device 116a for presentation within the GUI 404. The client device 116a presents the digital content items within the GUI 404 as the user 122a scrolls through the newsfeed 412. As shown, the newsfeed 412 includes a first digital content item 406 and a second digital content item 410.

The first digital content item 406 comprises images and text from the third party 112. The social networking system 102 generates the first digital content item 406 based on the images and text sent from the third-party device 106. Consistent with the disclosure above, the social networking system 102 adds the first digital content item 406 to the newsfeed 412 for the user 122a as sponsored content for an advertising campaign. In the embodiment shown in FIG. 4A, the first digital content item 406 includes text that promotes a social cause and prompts the user 122a to sign a digital document, that is, a digital petition.

In contrast to the first digital content item 406, the second digital content item 410 comes from a contact, friend, or follower of the user 122a. In other words, the second digital content item 410 is not sponsored content for an advertising campaign for the third party 112, but social networking activity from another user that the social networking system 102 adds to the newsfeed 412. Accordingly, in some embodiments, the newsfeed 412 comprises both social networking activity and digital content items sponsored by third parties.

Turning back now to the first digital content item 406. The first digital content item 406 includes a selectable option 408. As shown in FIG. 4A, the selectable option 408 is a call-to-action button. In alternative embodiments, however, other selectable options may be used consistent with the disclosure above. The selectable option 408 includes text that solicits support for the third party 112 (i.e., "Get Involved"). When the client device 116a detects a selection of the selectable option 408, the client device 116a sends an indication of that selection to the social networking system 102. The indication triggers the social networking system 102 to provide to the client device 116a a messaging thread between the user 122a and the third party 112.

FIG. 4B illustrates an example of a messaging thread between the user 122a and the third party 112. As shown in FIG. 4B, the client device 116a presents a messaging-thread display 416 within a graphical user interface 414 ("GUI 414") of the touch screen 402. Specifically, in response to the user 122a selecting the selectable option 408 by touch gesture, the client device 116a initiates the messaging application 120a and sends a request to the social networking system 102 for a messaging thread between the user 122a and the third party 112. Upon receiving that request, the social networking system 102 provides the messaging thread to the client device 116a for presentation within the GUI 414.

As further shown in FIG. 4B, the social networking system 102 uses a chatbot to generate a first automated message 418. The first automated message 418 includes a textual message 419 and a digital-document thumbnail 420.

The textual message 419 indicates delivery of a digital document (i.e., a digital petition for FIG. 4B) to the user 122a within the messaging thread. The digital-document thumbnail 420 includes a portion of the digital document's text. To facilitate presentation of additional text, the digital-document thumbnail 420 also contains an additional-text option 422. When the client device 116a detects a selection by the user 122a of the additional-text option 422, the client device 116a presents additional text of the digital document.

In addition to the textual message 419 and the digital-document thumbnail 420, the first automated message 418 includes a signature option 424, a donate option 426, and an email-distribution option 428. Consistent with the disclosure above, the signature option 424 is a selectable option that (upon selection) triggers the social networking system 102 to provide tools for the user 122a to digitally sign the digital document. By contrast, the donate option 426 is a selectable option that (upon selection) triggers the social networking system 102 to provide tools for donating to the third party 112. Finally, the email-distribution option 428 is a selectable option that (upon selection) triggers the social networking system 102 to provide tools for adding an email address to an email-distribution list of the third party 112.

Turning back now to the additional-text option 422, FIG. 4C illustrates the client device 116a presenting additional text from the digital document. As indicated above, in response to detecting a selection of the additional-text option 422 by touch gesture, the client device 116a presents additional text of the digital document. Accordingly, in FIG. 4C, the digital-document thumbnail 420 includes additional text of the digital document. In some embodiments, the client device 116a presents an entire text of a digital document in response to detecting a selection of the additional-text option 422.

As also noted above, in some embodiments, the signature option 424 triggers the social networking system 102 to provide tools for digitally signing the digital document. FIG. 4D illustrates an example of such tools. As shown in FIG. 4D, the client device 116a detects a selection by the user 122a of the signature option 424. In response to receiving an indication of the selection of the signature option 424, the social networking system 102 uses the chatbot to generate a second automated message 430 within the messaging thread between the user 122a and the third party 112.

The client device 116a presents the second automated message 430 within the messaging-thread display 416. As further shown in FIG. 4D, the second automated message 430 includes a textual message 431 indicating delivery of a digital signature for the user 122a within the messaging thread. The second automated message 430 also includes a digital-signature image 432. This digital-signature image 432 is an image (e.g., a JPG file) of a digital signature previously drawn by the user 122a that the social networking system 102 associated with an account of the user 122a and stored for later use.

As noted above, in some embodiments, the social networking system 102 provides tools for the user 122a to either confirm and use a digital signature provided by the social networking system 102 or create a new digital signature. The second automated message 430 includes such tools. Specifically, the second automated message 430 includes an add-signature option 434 and a new-signature option 436. Consistent with the disclosure above, the add-signature option 434 is a selectable option that (upon selection) triggers the social networking system 102 to add the digital signature depicted in the digital-signature image 432 to the digital document. By contrast, the new-signature option 436 is a selectable option that (upon selection) triggers the social networking system 102 to provide tools for the user 122a to input a new digital signature.

For example, the add-signature option 434 initiates the following actions. In response to detecting a selection by the user 122a of the add-signature option 434, the client device 116a sends an indication of that selection to the social networking system 102. Upon receiving the indication of that selection, the social networking system 102 adds the digital signature depicted in the digital-signature image 432 to the digital document. In the embodiment shown in FIG. 4D, the social networking system 102 adds the digital signature to a digital petition stored by the social networking system 102 for the third party 112. In some such embodiments, the social networking system 102 adds the digital-signature image 432 to one of many digital fields for digital signatures within the digital petition.

Figure 4F:
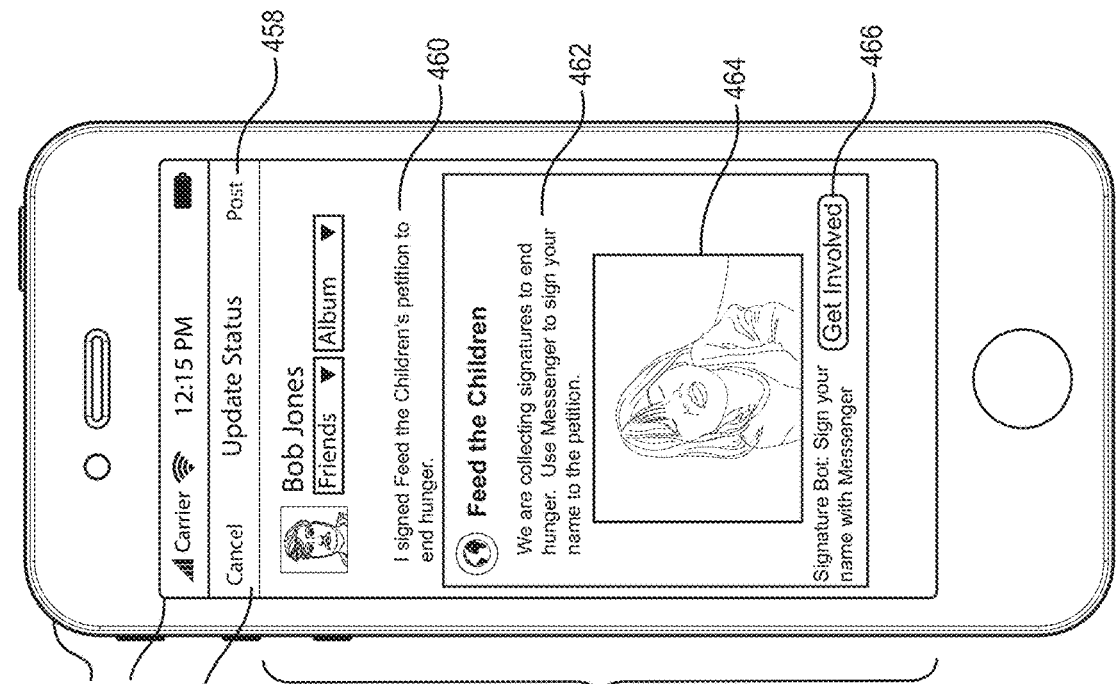
Figure 4E:
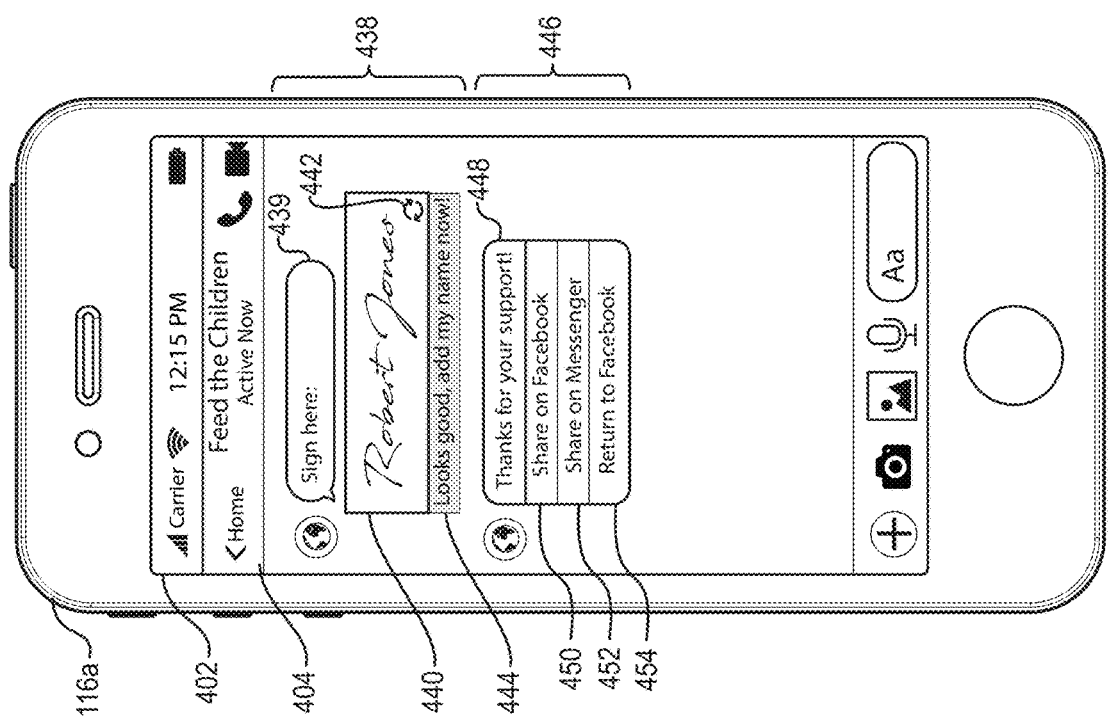

Turning now to FIG. 4E, this figure illustrates some of the tools that the new-signature option 436 triggers the social networking system 102 to provide. In response to detecting a selection by the user 122a of the new-signature option 436, the client device 116a sends an indication of that selection to the social networking system 102. Upon receiving the indication of that selection, the social networking system 102 uses the chatbot to generate a third automated message 438. The third automated message 438 includes a textual message 439 directing the user 122a to digitally sign his name within a digital signature field 440.

As shown in FIG. 4E, the third automated message 338 further includes the digital signature field 440. The digital signature field 440 is a digital space in which the user 122a may input a new digital signature. As indicated by FIG. 4E, the client device 116a detects touch gestures from the user 122a drawing a new digital signature within the digital signature field 440. The client device 116a then presents the new digital signature within the GUI 414 as shown in FIG. 4E. In some embodiments, in response to detecting a selection by the user 122a of a refresh-field option 442, the client device 116a deletes any digital signature within the digital signature field 440 and refreshes the digital signature field 440 to appear empty.

In addition to detecting a new digital signature, the client device 116a further detects a selection by the user 122a of an add-signature option 444. As suggested above, the add-signature option 444 is a selectable option that (upon selection) triggers the social networking system 102 to add the new digital signature (drawn within the digital signature field 440) to the digital document. The add-signature option 444 further triggers the social networking system 102 to use the chatbot to generate a fourth automated message 446 within the messaging thread.

As shown in FIG. 4E, the social networking system 102 provides the fourth automated message 446 in response to receiving an indication of selection of the add-signature option 444. After receiving the fourth automated message 446, the client device 116a presents the fourth automated message 446 within the messaging-thread display 416. The fourth automated message 446 includes a textual message 448. This textual message 448 acknowledges that the new digital signature has been added to the digital document.

As further shown in FIG. 4E, the fourth automated message 446 also includes three selectable options—a post-sharing option 450, a messaging-sharing option 452, and a return-to-newsfeed option 454. The post-sharing option 450 (upon selection) triggers the social networking system 102 to provide a suggested digital content item for the user 122a to post on a timeline. Similarly, the message-sharing option 452 (upon selection) triggers the social networking system 102 to generate a suggested message within a messaging thread for the user 122a to send to other users. By contrast, the return-to-newsfeed option 454 (upon selection) causes the social networking system 102 to redirect the client device 116a to back to the social networking application 118a and present a graphical user interface of the social networking application 118a, such as by again presenting the newsfeed 412.

In describing FIGS. 4B, 4D, and 4E, this disclosure refers to the first automated message 418, the second automated message 430, the third automated message 438, and the fourth automated message 446 in numerical order. But the numeric references of first, second, third, and fourth do not imply a set order. The social networking system 102 may generate automated messages in a different order. For example, in some embodiments, the social networking system 102 generates the first automated message 418, the second automated message 430, and the fourth automated message 446, but without the third automated message 438.

FIG. 4F illustrates an example of the social networking system 102 responding to a selection of the post-sharing option 450. Specifically, in response to receiving an indication that the user 122a selects the post-sharing option 450, the client device 116a transitions back to the social networking application 118a and presents a suggested digital content item 456 within the GUI 404. The suggested digital content item 456 includes a textual message 460 that indicates the user 122a supports the third party 112. In the embodiment shown in FIG. 4F, the textual message 460 indicates that the user 122a signed the digital document.

As further shown in FIG. 4F, the suggested digital content item 456 includes a third party's textual message 462 and a third party's image 464. As their names suggest, the social networking system 102 received the third party's textual message 462 and the third party's image 464 from the third party 112 to include within the suggested digital content item 456. The textual message 460, the third party's textual message 462, and the third party's image 464 together form part of the suggested digital content item 456 that promote a cause for the third party 112. In other embodiments, the social networking system 102 generates and provides different suggested digital content items that promote a product or service for the third party 112.

In addition to the promotional content, the suggested digital content item 456 further includes an additional selectable option 466. Like the selectable option 408 associated with the first digital content item 406 above, the additional selectable option 466 (upon selection) triggers the social networking system 102 to provide to a different client device a messaging thread between a selecting user and the third party 112. In other words, the additional selectable option triggers the social networking system 102 to generate automated messages within a messaging thread that prompts the selecting user to digitally sign a digital document for the third party 112. The automated messages shown in FIGS. 4B-4E provide examples of such automated messages.

To encourage the user 122a to post the suggested digital content item 456, the client device 116a further presents a post option 458 within the GUI 404. By providing the post option 458 and the suggested digital content item 456 together, the social networking system 102 provides easy-to-use options for the user 122a to post the suggested digital content item 456 with one (or a few) simple selections.

Upon detecting a selection by the user 122a of the post option 458, the client device 116a sends an indication of that selection to the social networking system 102. The social networking system 102 in turn adds the suggested digital content item 456 to a timeline of the user 122a. Once posted on the timeline, the social networking system 102 adds the suggested digital content item 456 to newsfeeds for other users of the social networking system 102.

Figure 4H:
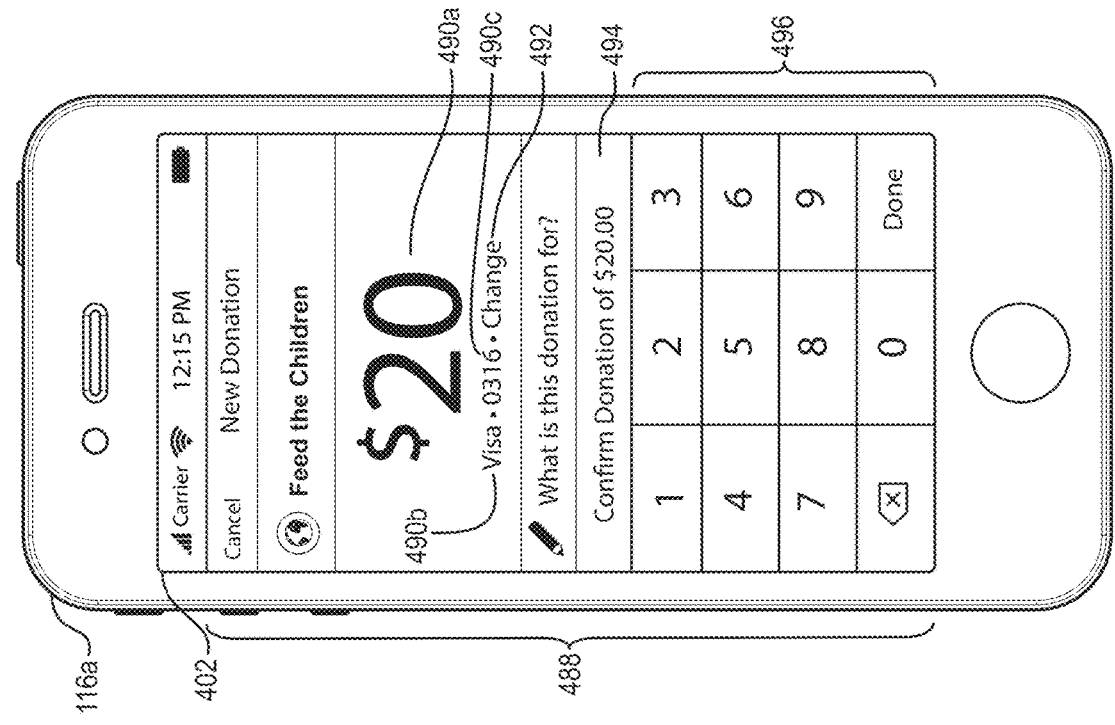
Figure 4G:
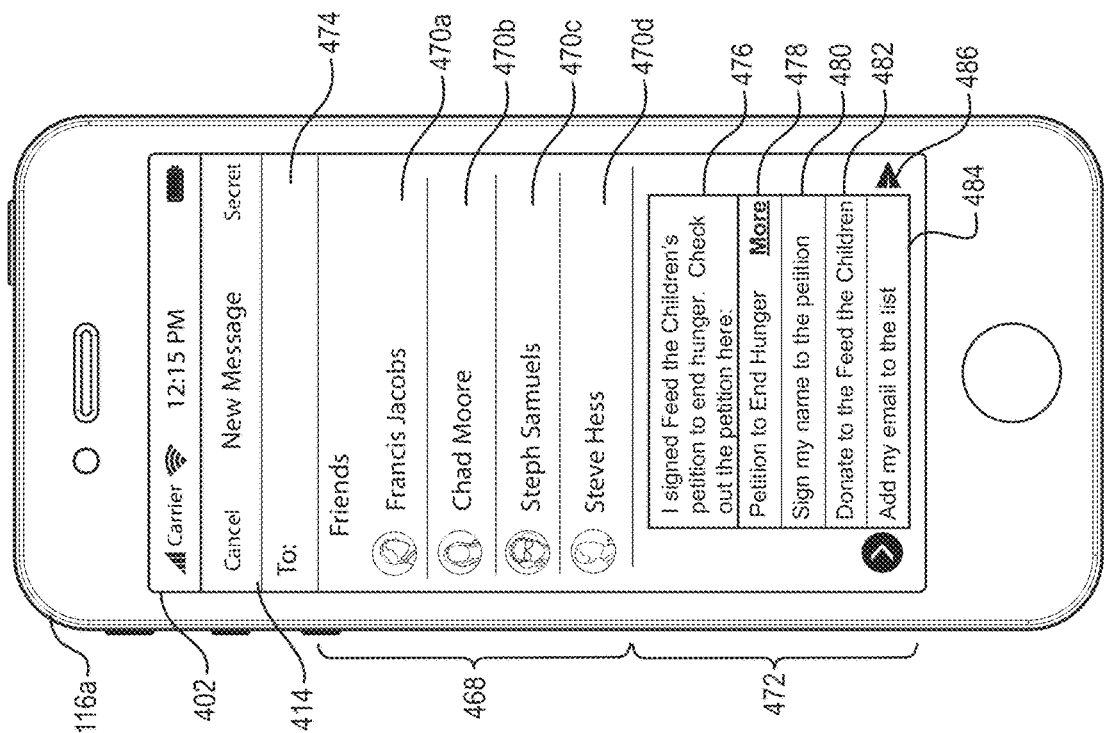

Turing now to FIG. 4G, this figure illustrates an example of the social networking system 102 responding to a selection of the message-sharing option 452. Specifically, in response to receiving an indication that the user 122a selects the message-sharing option 452, the client device 116a sends an indication of that selection to the social networking system 102. In response to receiving that indication, the social networking system 102 provides a potential-recipient list and a suggested message to the client device 116a. The client device 116a in turn presents a potential-recipient list 468 and a suggested message 470 within the GUI 414.

As shown in FIG. 4G, the potential-recipient list 468 includes a list of users of the social networking system 102 with whom the user 122a is connected. Specifically, the potential-recipient list 468 includes friends or followers of the user 122a who correspond to recipient options 470a-470d. When the client device 116a detects a selection of one of the recipient options 470a-470d by the user 122a, the client device 116a adds an indicator of the user corresponding to the selected recipient option to an addressee field 474. As suggested by FIG. 474, the addressee field 474 indicates the users who have been selected to receive the suggested message 472.

Turning back now to the suggested message 472, the suggested message 472 includes a textual message 476. The textual message 476 indicates that the user 122a supports the third party 112. Specifically, the textual message 460 indicates that the user 122a signed the digital document.

The suggested message 472 further includes a digital-document thumbnail 478, a signature option 480, a donation option 482, and an email-distribution option 484. After the client device 116a sends the suggested message 472 to a recipient user, the digital-document thumbnail 478, signature option 480, donation option 482, and email-distribution option 484 respectively resemble and function similarly as the digital-document thumbnail 420, signature option 424, donation option 426, and email-distribution option 428 shown in FIG. 4B—with at least one important difference.

When a recipient user receives the suggested message 472 within a messaging thread—and selects the digital-document thumbnail 478, signature option 480, donation option 482, or email-distribution option 484—the social networking system 102 provides an additional messaging thread between the recipient user and the third party 112 to the recipient user's device. After the client device 116a sends the suggested message 472 to a recipient user, the digital-document thumbnail 478, signature option 480, donation option 482, and email-distribution option 484 otherwise function the same as the digital-document thumbnail 420, signature option 424, donation option 426, and email-distribution option 428 shown in FIG. 4B.

As further shown in FIG. 4G, the GUI 414 includes a send option 486. Upon detecting a selection by the user 122a of the send option 486, the client device 116a sends the suggested message 472 (through the social networking system 102) to one or more recipient users within the addressee field 474. By providing the send option 486 and the suggested message 472 together, the social networking system 102 provides easy-to-use options for the user 122a to send a suggested message indicating support for the third party 112 to other users with one (or a few) simple selections. Once sent, the suggested message 472 likewise promotes a cause for the third party 112. As indicated above, a suggested message may also promote a product or service for the third party 112.

Turning now to FIG. 4H, as noted above, in some embodiments, the donate option 426 comprises a selectable option that (upon selection) triggers the social networking system 102 to provide tools for donating to the third party 112. FIG. 4H illustrates an example of such tools. As shown in FIG. 4H, the client device 116a detects a selection by the user 122a of the donation option 426. In response to receiving an indication of the selection of the donation option 426, the client device 116a generates payment fields 490a-490c within a payment interface 488. As shown the payment interface 488 resembles a payment interface for Facebook's Messenger Pay.

The payment fields 490a-490c each serve different purposes. The payment field 490a is a digital field for entering a donation amount. The payment field 490b is a digital field for entering a card type. The payment field 490c is a digital field for a card number. As shown in FIG. 4G, the payment field 490a includes a donation amount detected by the client device 116a from touch gestures by the user 122a corresponding to a numerical digit interface 496. By contrast, the payment field 490b includes a card type for a credit card number saved by the social networking system 102 for the user 122a. The payment field 490c similarly includes a portion of a credit card number saved by the social networking system 102 for the user 122a.

Although not shown in FIG. 4H, in alternative embodiments, the client device 116a generates blank payment fields for a credit or debit card number, an expiration date, a cardholder name, a credit security code, and a payment amount. For example, the client device 116a optionally generates such blank payment fields in response to detecting a selection of a change-payment-method option 492 included within the payment interface 488. Upon detecting input from the user 122a corresponding to each blank payment field, the client device 116a presents payment information within the formerly blank payment fields.

As further shown in FIG. 4H, the client device 116a further generates and presents a donate-confirmation option 494. Upon detecting a selection by the user 122a of the donate-confirmation option 494, the client device 116a sends payment information to the social networking system 102 for processing of a donation. Specifically, the client device 116a sends a credit card number, an expiration date, a cardholder name, a credit security code, and a payment amount to the social networking system 102 for processing of the donation. Consistent with the disclosure above, the social networking system 102 processes the donation.

Figure 4I:
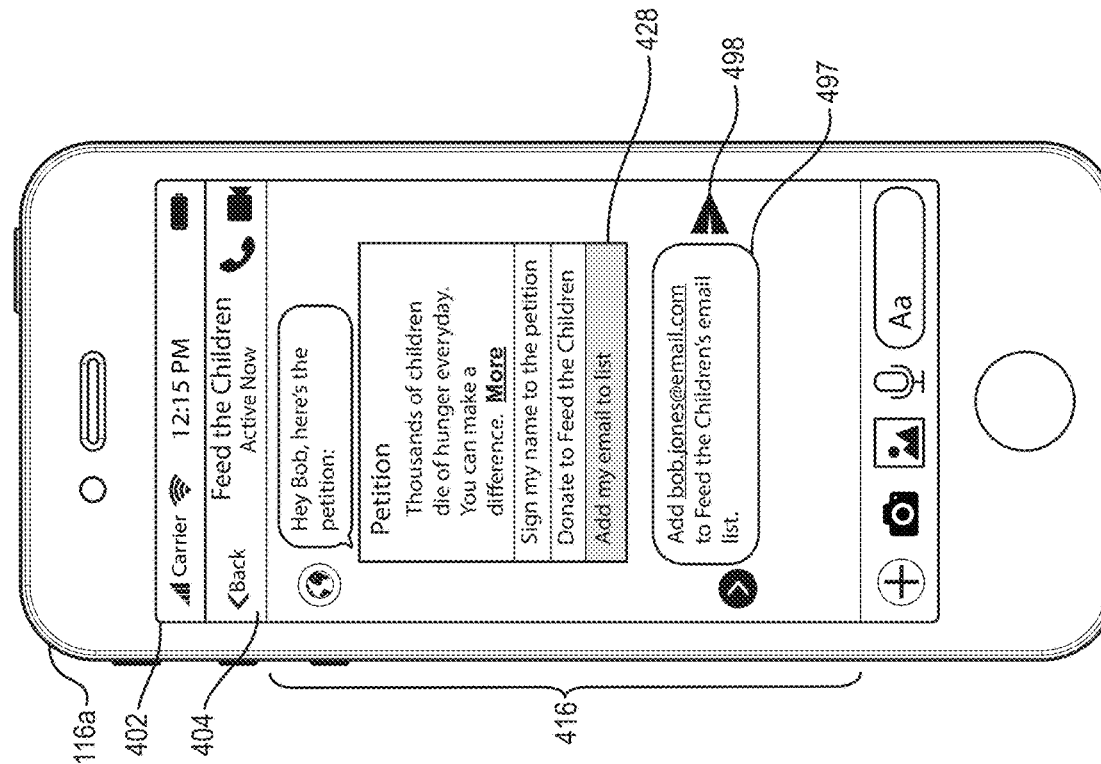

Turning now to FIG. 4I, as noted above, the email-distribution option 428 is a selectable option that (upon selection) triggers the social networking system 102 to provide tools for adding an email address to an email-distribution list of the third party 112. FIG. 4H illustrates an example of an automated message that facilitates adding an email address to an email-distribution list of the third party 112. As shown in FIG. 4I, the client device 116a detects a selection by the user 122a of the email-distribution option 428 and sends an indication of that selection to the social networking system 102. In response to receiving that indication, the social networking system 102 users the chatbot to generate a suggested message 497 within the messaging thread between the user 122a and the third party 112.

Upon receiving the suggested message 497, the client device 116a presents the suggested message 497 within the messaging-thread display 416. As shown in FIG. 4I, the suggested message 497 indicates that the user 122a has selected to add his email address to an email-distribution list of the third party 112. The suggested message 497 further includes an email address entered within profile information for an account of the user 122a.

In addition to the suggested message 497, the client device 116a further presents a send option 498 that (upon selection) sends the suggested message 497 to the social networking system 102 to add to the messaging thread and to relay to the third-party device 106.

Figure 5:
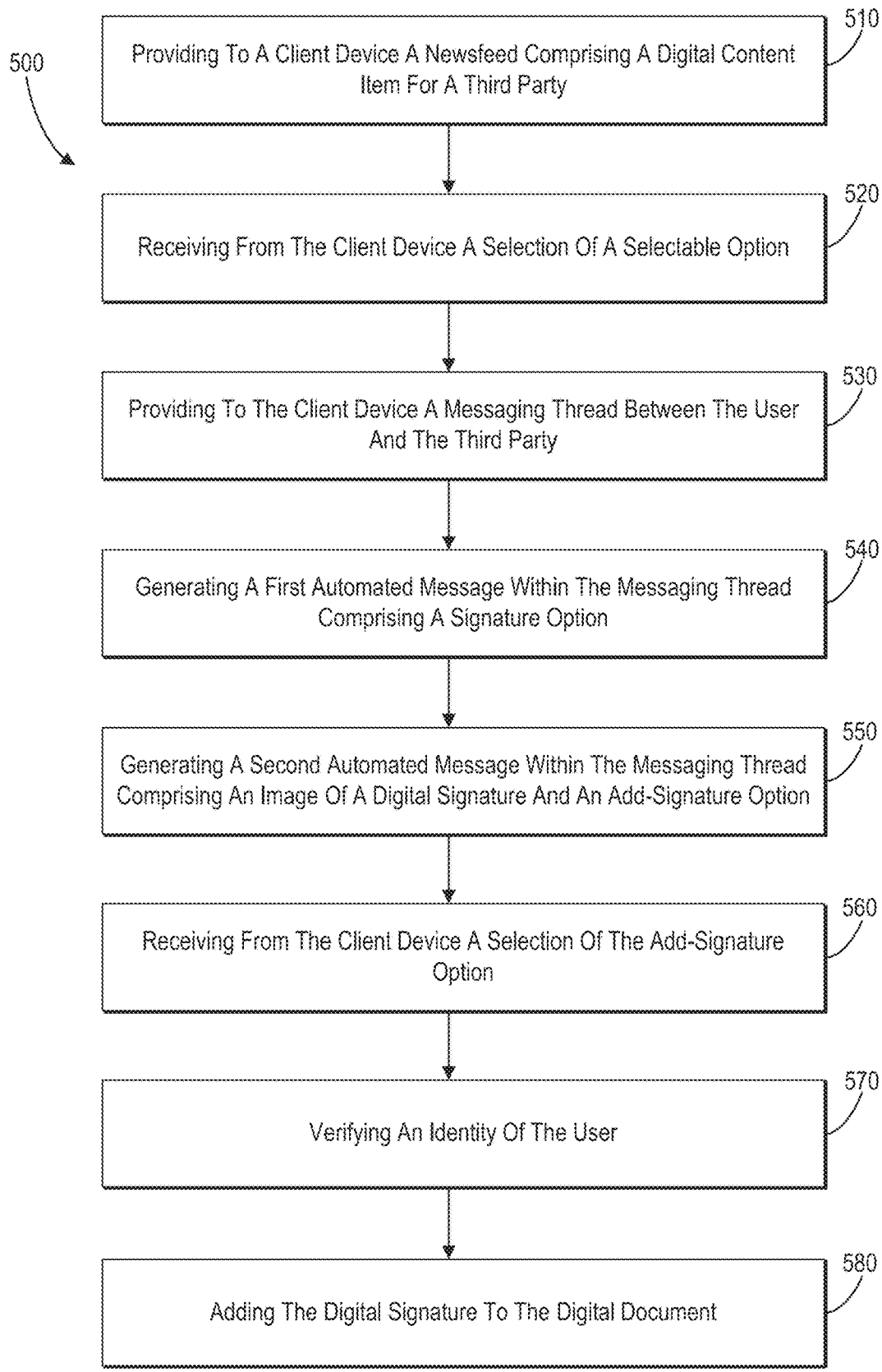
FIG. 5 illustrates a flowchart of a series of acts in a method of generating automated messages within a messaging thread for a verified user of a social networking system to digitally sign a digital document in accordance with one or more embodiments.

Turning now to FIG. 5, this figure illustrates a flowchart of a series of acts in a method 500 of generating automated messages within a messaging thread for a verified user of a social networking system to digitally sign a digital document in accordance with one or more embodiments. While FIG. 5 illustrates acts according to one embodiment, alternative embodiments may omit, add to, reorder, and/or modify any of the acts shown in FIG. 5.

As shown in FIG. 5, the method 500 includes an act 510 of providing to a client device a newsfeed comprising a digital content item for a third party. In particular, in some embodiments, the act 510 includes providing, to a client device associated with a user of a social networking system, a newsfeed of social networking activity, the newsfeed comprising a digital content item for a third party.

As further shown in FIG. 5, the method 500 includes an act 520 of receiving from the client device a selection of a selectable option. In particular, in some embodiments, the act 520 includes receiving from the client device a selection by the user of a selectable option associated with the digital content item.

As further shown in FIG. 5, the method 500 includes an act 530 of providing to the client device a messaging thread between the user and the third party. In particular, in some embodiments, the act 530 includes, in response to receiving the selection of the selectable option, providing to the client device a messaging thread between the user and the third party.

As further shown in FIG. 5, the method 500 includes an act 540 of generating a first automated message within the messaging thread comprising a signature option. In particular, in some embodiments, the act 540 includes generating a first automated message within the messaging thread comprising a signature option to digitally sign a digital document.

For example, in some embodiments, generating the first automated message comprises generating the first automated message within the messaging thread comprising a donate option for the user to donate money to the third party. Additionally, or alternatively, in some embodiments, generating the first automated message comprises generating the first automated message within the messaging thread comprising an email-distribution option for the user to receive emails from the third party. Relatedly, in some embodiments, generating the first automated message comprises generating the first automated message within the messaging thread comprising a view option to view the digital document in its entirety.

As further shown in FIG. 5, the method 500 includes an act 550 of generating a second automated message within the messaging thread comprising an image of a digital signature and an add-signature option. In particular, in some embodiments, the act 550 includes, in response to receiving from the client device a selection by the user of the signature option, generating a second automated message within the messaging thread comprising an image of a digital signature for the user and an add-signature option to add the digital signature to the digital document.

For example, in some embodiments, generating the second automated message comprises generating the second automated message within the messaging thread comprising an automatically generated image of a digital signature for the user based on a name designated for an account of the user for the social networking system.

As further shown in FIG. 5, the method 500 includes an act 560 of receiving from the client device a selection of the add-signature option. In particular, in some embodiments, the act 560 includes receiving from the client device a selection by the user of the add-signature option.

As further shown in FIG. 5, the method 500 includes an act 570 of verifying an identity of the user. For example, in some embodiments, verifying the identity of the user comprises comparing a location of the client device and a device identifier of the client device to locations and device identifiers of one or more client devices tracked within a user history for the user. Additionally, in certain embodiments, verifying the identity of the user occurs before providing the newsfeed of social networking activity.

As further shown in FIG. 5, the method 500 includes an act 580 of adding the digital signature to the digital document. In particular, in some embodiments, the act 580 includes, based on receiving the selection of the add-signature option and verifying the identity of the user, adding the digital signature to the digital document.

In addition to the acts 510-580, in some embodiments, the method 500 further includes redirecting the client device to the newsfeed. Moreover, in certain embodiments, generating the second automated message comprises generating the second automated message comprising a new-signature option to input a new digital signature; receiving from the client device the selection by the user of the add-signature option comprises: receiving from the client device a selection by the user of the new-signature option; providing to the client device within the messaging thread a digital signature field within which the user may input the new digital signature; receiving user input representing the new digital signature within the digital signature field; and receiving from the client device a selection by the user to add the new digital signature to the digital document; and adding the digital signature to the digital document comprises adding the new digital signature to the digital document.

By contrast, in some embodiments, generating the second automated message comprises generating the second automated message comprising a preloaded image of a previous digital signature of the user; and receiving from the client device a selection by the user of the add-signature option comprises receiving a confirmation from the client device that the preloaded image of the previous digital signature represents a signature of the user.

Additionally, in some embodiments that include the donate option, the method 500 further includes receiving from the client device an indication of user input indicating a donation amount and a payment method entered within payment fields; receiving from the client device a confirmation to donate to the third party; and in response to receiving the confirmation from the client device to donate to the third party, processing a donation from the user for the third party in the donation amount using the payment method.

Additionally, in some embodiments, the method 500 further includes receiving from the client device a selection by the user of the email-distribution option; generating a third automated message within the messaging thread comprising an email address associated with an account of the user for the social networking system; receiving from the client device a selection by the user to add the email address to an email-distribution list of the third party; and sending the email address to the third party to add to the email-distribution list.

Relatedly, in some embodiments, the method 500 further includes receiving from the client device the selection by the user to add the email address to the email-distribution list of the third party comprises receiving an updated email address for the user from the client device; and sending the email address to the third party to add to the email-distribution list comprises sending the updated email address to the third party to add to the email-distribution list. In some such embodiments, receiving from the client device the selection by the user to add the email address to the email-distribution list of the third party comprises receiving a confirmation from the client device to add the email address to the email-distribution list of the third party.

As suggested above, in some embodiments, the method 500 includes a post-sharing option. For example, in certain embodiments, the method 500 includes generating a third automated message comprising a post-sharing option for the social networking system to post a suggested digital content item to the user's timeline indicating that the user supports the third party; receiving from the client device a selection by the user of the post-sharing option; in response to receiving a selection from the client device of the post-sharing option, providing to the client device the suggested digital content item for the user's timeline; and in response to receiving a confirmation from the client device to post the suggested digital content item, posting the suggested digital content item to the user's timeline indicating that the user supports the third party.

Relatedly, in some embodiments, providing to the client device the suggested digital content item for the user's timeline comprises providing to the client device the suggested digital content item comprising an additional selectable option for users of the social networking system to support the third party; and posting the suggested digital content item to the user's timeline comprises posting the suggested digital content item comprising the additional selectable option to the user's timeline.

Alternatively, in certain embodiments, providing to the client device the suggested digital content item for the user's timeline comprises: providing to the client device an edit option to edit a text of the suggested digital content item indicating that the user supports the third party; and receiving, from the client device, user input that edits the text of the suggested digital content item; wherein posting the suggested digital content item to the user's timeline comprises posting the suggested digital content item with an edited text to the user's timeline indicating that the user supports the third party.

Additionally, or alternatively, in some embodiments, generating the third automated message comprising the post-sharing option for the social networking system to post the suggested digital content item to the user's timeline indicating that the user supports the third party comprises generating the third automated message comprising the post-sharing option for the social networking system to post the suggested digital content item to the user's timeline indicating that the user signed the digital document.

As also suggested above, in some embodiments, the method 500 includes a message-sharing option. For example, in certain embodiments, the method 500 includes generating a third automated message comprising a message-sharing option to notify other users of the social networking system in messaging threads that the user signed the digital document; receiving from the client device a selection by the user of the message-sharing option; and providing a list of users of the social networking system with whom the user is connected and a suggested message indicating that the user supports the third party; in response to receiving from the client device a selection by the user of an additional user of the social networking system and a send option, generating the suggested message indicating that the user supports the third party within an additional messaging thread between the user and the additional user.

Relatedly, in some embodiments, generating the suggested message comprises generating the suggested message comprising an additional selectable option for the additional user to digitally sign the digital document.

Figure 6:
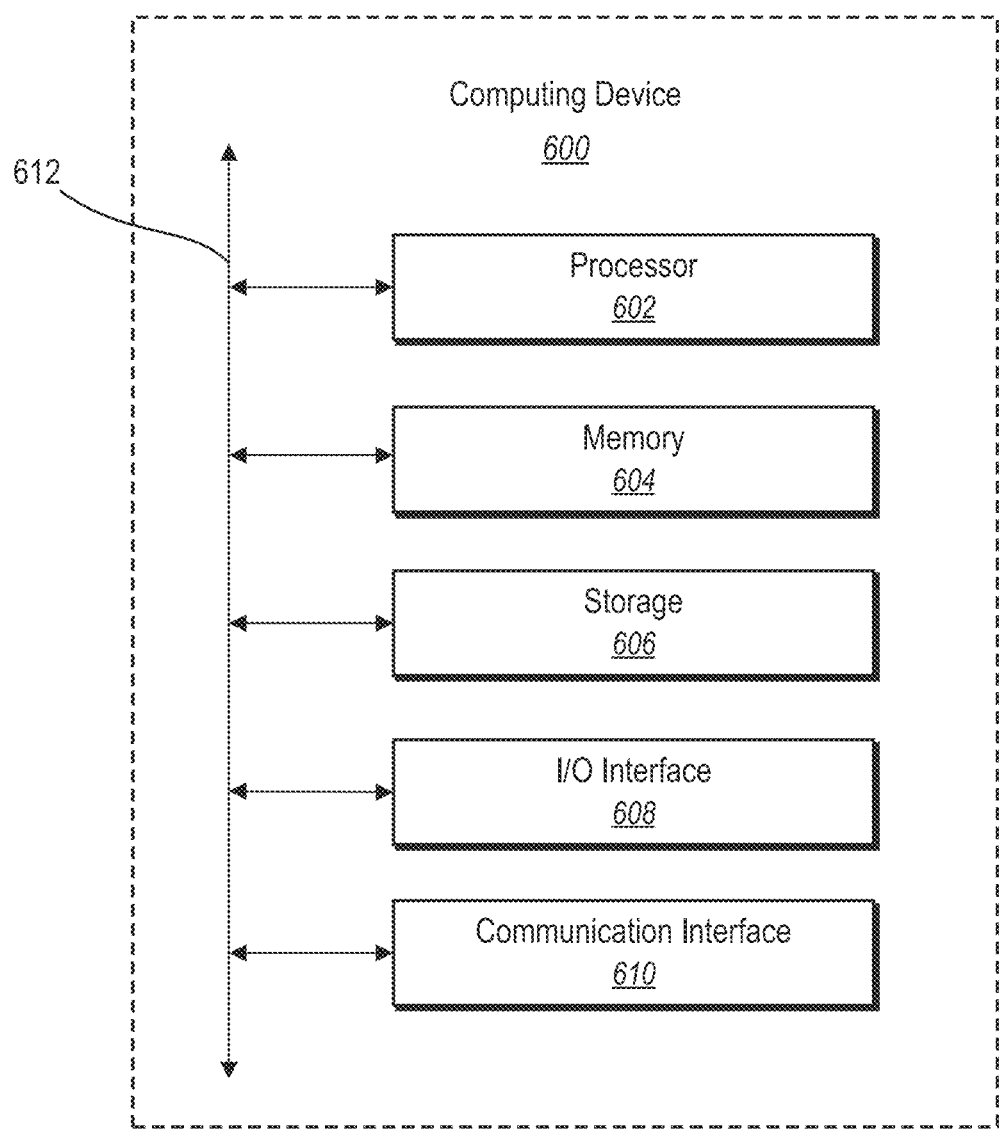
FIG. 6 illustrates a block diagram of an example computing device in accordance with one or more embodiments.

FIG. 6 illustrates a block diagram of exemplary computing device 600 that may be configured to perform one or more of the processes described above. One will appreciate that one or more computing devices such as the computing device 600 may implement the social networking system 102. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers ("TLBs"). Instructions in the instruction caches may be copies of instructions in the memory 604 or the storage device 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive ("HDD"), flash memory, an optical disc, a magneto-optical disc, magnetic tape, or a Universal Serial Bus ("USB") drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touchscreen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 610 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 610 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other visual media items to a user's profile page (typically known as "wall posts" or "timeline posts") or in a photo album, both of which may be accessible to other users of the social-networking system depending upon the user's configured privacy settings.

Figure 7:
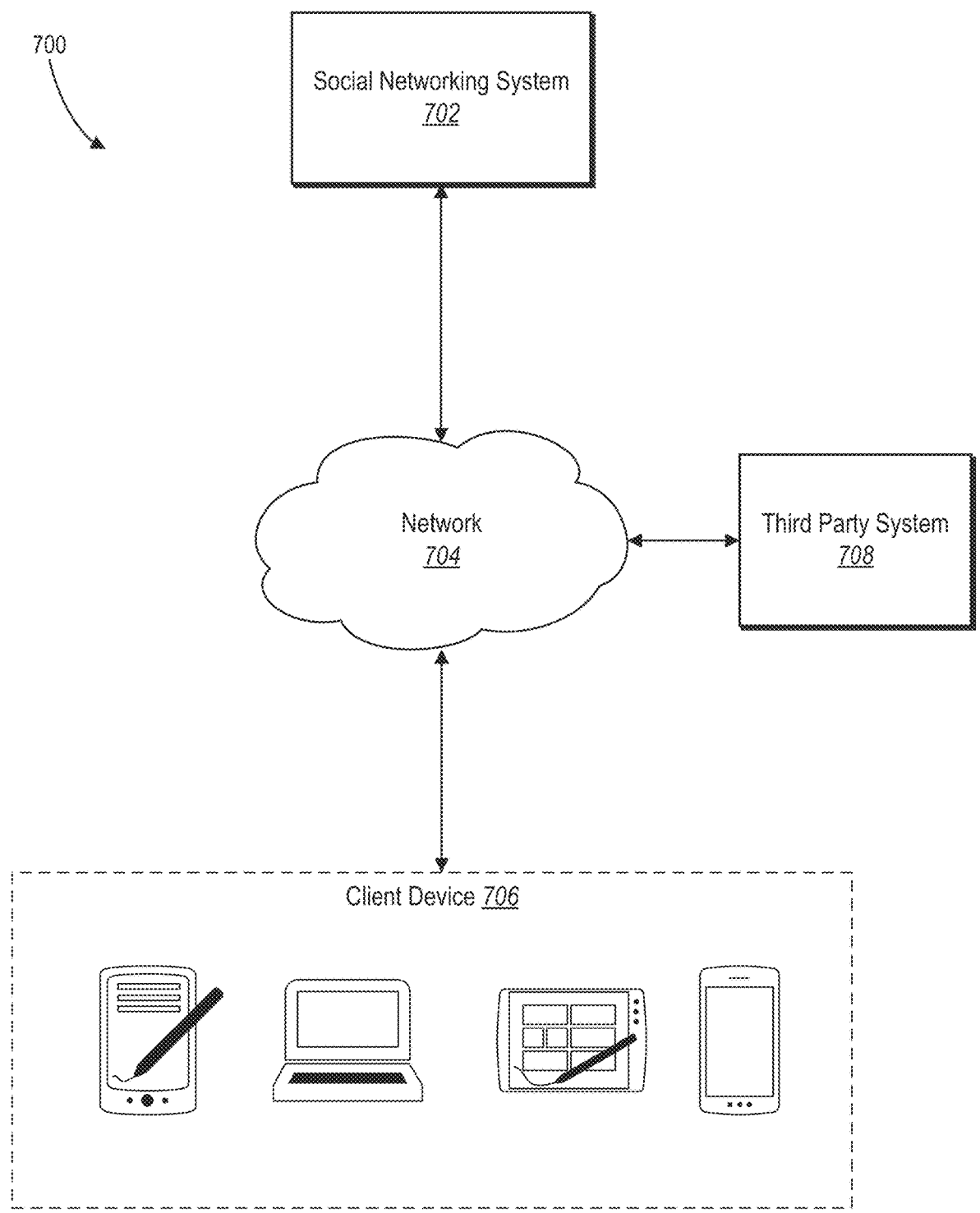
FIG. 7 illustrates a network environment of a networking system according to one or more embodiments.

FIG. 7 illustrates an example network environment 700 of a social-networking system. Network environment 700 includes a client device 706, a social networking system 702, and a third-party system 708 connected to each other by a network 704. Although FIG. 7 illustrates a particular arrangement of client device 706, social networking system 702, third-party system 708, and network 704, this disclosure contemplates any suitable arrangement of client device 706, social networking system 702, third-party system 708, and network 704. As an example and not by way of limitation, two or more of client device 706, social networking system 702, and third-party system 708 may be connected to each other directly, bypassing network 704. As another example, two or more of client device 706, social networking system 702, and third-party system 708 may be physically or logically co-located with each other in whole or in part. Moreover, although FIG. 7 illustrates a particular number of client devices 706, social networking systems 702, third-party systems 708, and networks 704, this disclosure contemplates any suitable number of client devices 706, social networking systems 702, third-party systems 708, and networks 704. As an example and not by way of limitation, network environment 700 may include multiple client devices 706, social networking systems 702, third-party systems 708, and networks 704.

This disclosure contemplates any suitable network 704. As an example and not by way of limitation, one or more portions of network 704 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 704 may include one or more networks 704.

Links may connect client device 706, social networking system 702, and third-party system 708 to communication network 704 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client device 706 may be an electronic device including hardware, software, or embedded logic components or a combination of two or more such components and capable of carrying out the appropriate functionalities implemented or supported by client device 706. As an example and not by way of limitation, a client device 706 may include any of the computing devices discussed above in relation to FIG. 7. A client device 706 may enable a network user at client device 706 to access network 704. A client device 706 may enable its user to communicate with other users at other client devices 706.

In particular embodiments, client device 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 706 may enter a Uniform Resource Locator ("URL") or other address directing the web browser to a particular server (such as server, or a server associated with a third-party system 708), and the web browser may generate a Hyper Text Transfer Protocol ("HTTP") request and communicate the HTTP request to server. The server may accept the HTTP request and communicate to client device 706 one or more Hyper Text Markup Language ("HTML") files responsive to the HTTP request. Client device 706 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 702 may be a network-addressable computing system that can host an online social network. Social networking system 702 may generate, store, receive, and send social-networking data, such as, for example, user-profile data, concept-profile data, social-graph information, or other suitable data related to the online social network. Social networking system 702 may be accessed by the other components of network environment 700 either directly or via network 704. In particular embodiments, social networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 706, a social networking system 702, or a third-party system 708 to manage, retrieve, modify, add, or delete, the information stored in data store.

In particular embodiments, social networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 702 may provide users of the online social network the ability to communicate and interact with other users. In particular embodiments, users may join the online social network via social networking system 702 and then add connections (e.g., relationships) to a number of other users of social networking system 702 whom they want to be connected to. Herein, the term "friend" may refer to any other user of social networking system 702 with whom a user has formed a connection, association, or relationship via social networking system 702.

In particular embodiments, social networking system 702 may provide users with the ability to take actions on various types of items or objects, supported by social networking system 702. As an example and not by way of limitation, the items and objects may include groups or social networks to which users of social networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 702 or by an external system of third-party system 708, which is separate from social networking system 702 and coupled to social networking system 702 via a network 704.

In particular embodiments, social networking system 702 may be capable of linking a variety of entities. As an example and not by way of limitation, social networking system 702 may enable users to interact with each other as well as receive content from third-party systems 708 or other entities, or to allow users to interact with these entities through an application programming interfaces ("API") or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating social networking system 702. In particular embodiments, however, social networking system 702 and third-party systems 708 may operate in conjunction with each other to provide social-networking services to users of social networking system 702 or third-party systems 708. In this sense, social networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client device 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 702 also includes user-generated content objects, which may enhance a user's interactions with social networking system 702. User-generated content may include anything a user can add, upload, send, or "post" to social networking system 702. As an example and not by way of limitation, a user communicates posts to social networking system 702 from a client device 706. Posts may include data such as status updates or other textual data, location information, photos, videos, links, music or other similar data or media. Content may also be added to social networking system 702 by a third-party through a "communication channel," such as a newsfeed or stream.

In particular embodiments, social networking system 702 may include a variety of servers, sub-systems, programs, modules, logs, and data stores. In particular embodiments, social networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 702 may also include suitable components such as network interfaces, security mechanisms, load balancers, failover servers, management-and-network-operations consoles, other suitable components, or any suitable combination thereof. In particular embodiments, social networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 702 to one or more client devices 706 or one or more third-party system 708 via network 704. The web server may include a mail server or other messaging functionality for receiving and routing messages between social networking system 702 and one or more client devices 706. An API-request server may allow a third-party system 708 to access information from social networking system 702 by calling one or more APIs. An action logger may be used to receive communications from a web server about a user's actions on or off social networking system 702. In conjunction with the action log, a third-party-content-object log may be maintained of user exposures to third-party-content objects. A notification controller may provide information regarding content objects to a client device 706. Information may be pushed to a client device 706 as notifications, or information may be pulled from client device 706 responsive to a request received from client device 706. Authorization servers may be used to enforce one or more privacy settings of the users of social networking system 702. A privacy setting of a user determines how particular information associated with a user can be shared. The authorization server may allow users to opt in to or opt out of having their actions logged by social networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client devices 706 associated with users. Advertisement-pricing modules may combine social information, the current time, location information, or other suitable information to provide relevant advertisements, in the form of notifications, to a user.

Figure 8:
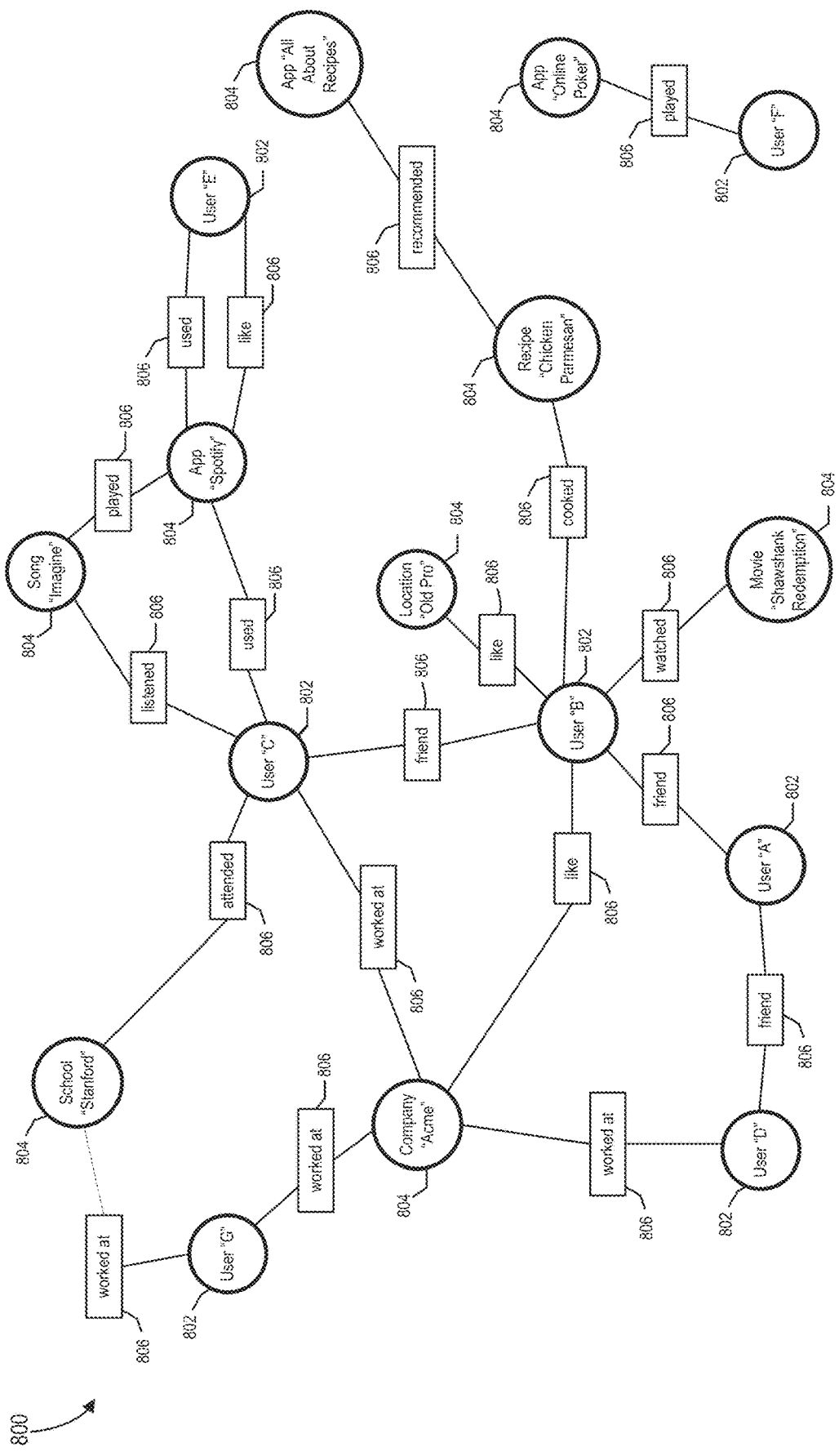
FIG. 8 illustrates an example social graph for a networking system in accordance with one or more embodiments.

FIG. 8 illustrates example social graph 800. In particular embodiments, social networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social networking system 702, client device 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social networking system 702. As an example and not by way of limitation, a user may be an individual (human user), an entity (e.g., an enterprise, business, or third-party application), or a group (e.g., of individuals or entities) that interacts or communicates with or over social networking system 702. In particular embodiments, when a user registers for an account with social networking system 702, social networking system 702 may create a user node 802 corresponding to the user, and store the user node 802 in one or more data stores. Users and user nodes 802 described herein may, where appropriate, refer to registered users and user nodes 802 associated with registered users. In addition, or as an alternative, users and user nodes 802 described herein may, where appropriate, refer to users that have not registered with social networking system 702. In particular embodiments, a user node 802 may be associated with information provided by a user or information gathered by various systems, including social networking system 702. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 804 may correspond to a concept. As an example and not by way of limitation, a concept may correspond to a place (such as, for example, a movie theater, restaurant, landmark, or city); a website (such as, for example, a website associated with social networking system 702 or a third-party website associated with a web-application server); an entity (such as, for example, a person, business, group, sports team, or celebrity); a resource (such as, for example, an audio file, video file, digital photo, text file, structured document, or application) which may be located within social networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address);

other suitable concept information; or any suitable combination of such information. In particular embodiments, a concept node 804 may be associated with one or more data objects corresponding to information associated with concept nodes 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social networking system 702. Profile pages may also be hosted on third-party websites associated with a third-party system 708. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept nodes 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 706 to send to social networking system 702 a message indicating the user's action. In response to the message, social networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social networking system 702 may send a "friend request" to the second user. If the second user confirms the "friend request," social networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept nodes 804 for "SPOTIFY").

In particular embodiments, social networking system 702 may create an edge 806 between a user node 802 and a concept node 804 in social graph 800. As an example and not by way of limitation, a user viewing a concept-profile page (such as, for example, by using a web browser or a special-purpose application hosted by the user's client device 706) may indicate that he or she likes the concept represented by the concept nodes 804 by clicking or selecting a "Like" icon, which may cause the user's client device 706 to send to social networking system 702 a message indicating the user's liking of the concept associated with the concept-profile page. In response to the message, social networking system 702 may create an edge 806 between user node 802 associated with the user and concept nodes 804, as illustrated by "like" edge 806 between the user and concept nodes 804. In particular embodiments, social networking system 702 may store an edge 806 in one or more data stores. In particular embodiments, an edge 806 may be automatically formed by social networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 702) or RSVP (e.g., through social networking system 702) to an event associated with the advertisement. In addition or as an alternative, an advertisement may include social-networking-system context directed to the user. As an example and not by way of limitation, an advertisement may display information about a friend of the user within social networking system 702 who has taken an action associated with the subject matter of the advertisement.

In particular embodiments, social networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 702 may calculate a coefficient based on a user's actions. Social networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Social networking system 702 may analyze a user's actions to determine whether one or more of the actions indicate an affinity for subject matter, content, other users, and so forth. As an example and not by way of limitation, if a user may make frequently posts content related to "coffee" or variants thereof, social networking system 702 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 702 may calculate a coefficient based on the type of relationship between particular objects. Referencing the social graph 800, social networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 702 may determine that the user has a higher coefficient with respect to the first photo than the second photo because having a tagged-in-type relationship with content may be assigned a higher weight and/or rating than having a like-type relationship with content. In particular embodiments, social networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 702 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 706 of the user). A first user may be more interested in other users or concepts that are closer to the first user. As an example and not by way of limitation, if a user is one mile from an airport and two miles from a gas station, social networking system 702 may determine that the user has a higher coefficient for the airport than the gas station based on the proximity of the airport to the user.

In particular embodiments, social networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 702 may provide information that is relevant to user's interests and current circumstances, increasing the likelihood that they will find such information of interest. In particular embodiments, social networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, social networking system 702 may calculate the coefficient (or access the coefficient information if it has previously been calculated and stored). In particular embodiments, social networking system 702 may measure an affinity with respect to a particular process. Different processes (both internal and external to the online social network) may request a coefficient for a particular object or set of objects. Social networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or acts disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 702 may send a request to the data store for the object. The request may identify the user associated with the request and may only be sent to the user (or a client device 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

I claim:

1. A method comprising:
providing, to a client device associated with a user of a social networking system, a newsfeed of social networking activity, the newsfeed comprising a digital content item for a third party;
receiving from the client device a selection by the user of a selectable option associated with the digital content item;
in response to receiving the selection of the selectable option, providing to the client device a messaging thread between the user and the third party;
generating a first automated message within the messaging thread comprising a signature option to digitally sign a digital document;
in response to receiving from the client device a selection by the user of the signature option, generating a second automated message within the messaging thread comprising an image of a digital signature for the user and an add-signature option to add the digital signature to the digital document;
receiving from the client device a selection by the user of the add-signature option;
verifying an identity of the user; and
based on receiving the selection of the add-signature option and verifying the identity of the user, adding the digital signature to the digital document.

2. The method of claim 1, wherein generating the second automated message comprises generating the second automated message comprising a new-signature option to input a new digital signature;
wherein receiving from the client device the selection by the user of the add-signature option comprises:
receiving from the client device a selection by the user of the new-signature option;
providing to the client device within the messaging thread a digital signature field within which the user may input the new digital signature;
receiving user input representing the new digital signature within the digital signature field; and
receiving from the client device a selection by the user to add the new digital signature to the digital document; and
wherein adding the digital signature to the digital document comprises adding the new digital signature to the digital document.

3. The method of claim 1, wherein:
generating the second automated message comprises generating the second automated message comprising a preloaded image of a previous digital signature of the user; and
receiving from the client device a selection by the user of the add-signature option comprises receiving a confirmation from the client device that the preloaded image of the previous digital signature represents a signature of the user.

4. The method of claim 1, wherein generating the first automated message comprises generating the first automated message within the messaging thread comprising a donate option for the user to donate money to the third party.

5. The method of claim 4, further comprising:
receiving from the client device an indication of user input indicating a donation amount and a payment method entered within payment fields;
receiving from the client device a confirmation to donate to the third party; and
in response to receiving the confirmation from the client device to donate to the third party, processing a donation from the user for the third party in the donation amount using the payment method.

6. The method of claim 1, wherein verifying the identity of the user comprises comparing a location of the client device and a device identifier of the client device to locations and device identifiers of one or more client devices tracked within a user history for the user.

7. The method of claim 1, wherein verifying the identity of the user occurs before providing the newsfeed of social networking activity.

8. A system comprising:
at least one processor; and
at least one non-transitory computer readable storage medium storing instructions that, when executed by the at least one processor, cause the system to:
provide, to a client device associated with a user of a social networking system, a newsfeed of social networking activity, the newsfeed comprising a digital content item for a third party;

receive from the client device a selection by the user of a selectable option associated with the digital content item;

in response to receiving the selection of the selectable option, provide to the client device a messaging thread between the user and the third party;

generate a first automated message within the messaging thread comprising a signature option to digitally sign a digital document;

in response to receiving from the client device a selection by the user of the signature option, generate a second automated message within the messaging thread comprising an image of a digital signature for the user and an add-signature option to add the digital signature to the digital document;

receive from the client device a selection by the user of the add-signature option;

verify an identity of the user; and based on receiving the selection of the add-signature option and verifying the identity of the user, add the digital signature to the digital document.

9. The system of claim 8, further comprising instructions that, when executed by the at least one processor, cause the system to redirect the client device to the newsfeed.

10. The system of claim 8, further comprising instructions that, when executed by the at least one processor, cause the system to:

generate a third automated message comprising a post-sharing option for the social networking system to post a suggested digital content item to the user's timeline indicating that the user supports the third party;

receive from the client device a selection by the user of the post-sharing option;

in response to receiving a selection from the client device of the post-sharing option, provide to the client device the suggested digital content item for the user's timeline; and in response to receiving a confirmation from the client device to post the suggested digital content item, post the suggested digital content item to the user's timeline indicating that the user supports the third party.

11. The system of claim 10, wherein:

the instructions that cause the system to provide to the client device the suggested digital content item for the user's timeline comprise instructions that, when executed by the at least one processor, cause the system to provide to the client device the suggested digital content item comprising an additional selectable option for users of the social networking system to support the third party; and the instructions that cause the system to post the suggested digital content item to the user's timeline comprise instructions that, when executed by the at least one processor, cause the system to post the suggested digital content item comprising the additional selectable option to the user's timeline.

12. The system of claim 10, wherein the instructions that cause the system to provide to the client device the suggested digital content item for the user's timeline comprise instructions that, when executed by the at least one processor, cause the system to:

provide to the client device an edit option to edit a text of the suggested digital content item indicating that the user supports the third party; and receive, from the client device, user input that edits the text of the suggested digital content item;

wherein the instructions that cause the system to post the suggested digital content item to the user's timeline comprise instructions that, when executed by the at least one processor, cause the system to post the suggested digital content item with an edited text to the user's timeline indicating that the user supports the third party.

13. The system of claim 10, wherein the instructions that cause the system to generate the third automated message comprising the post-sharing option for the social networking system to post the suggested digital content item to the user's timeline indicating that the user supports the third party comprise instructions that, when executed by the at least one processor, cause the system to generate the third automated message comprising the post-sharing option for the social networking system to post the suggested digital content item to the user's timeline indicating that the user signed the digital document.

14. The system of claim 8, wherein the instructions that cause the system to generate the second automated message comprise instructions that, when executed by the at least one processor, cause the system to generate the second automated message within the messaging thread comprising an automatically generated image of a digital signature for the user based on a name designated for an account of the user for the social networking system.

* * * * *